US009735973B2

(12) United States Patent
Tabrizi et al.

(10) Patent No.: US 9,735,973 B2
(45) Date of Patent: Aug. 15, 2017

(54) EXPERT ANSWER PLATFORM METHODS, APPARATUSES AND MEDIA

(71) Applicant: Vidoyen Inc., Toronto (CA)

(72) Inventors: Arshia Tabrizi, Toronto (CA); Michael Jarema, Toronto (CA)

(73) Assignee: Vidoyen Inc., Toronto (CA)

( * ) Notice: Subject to any disclaimer, the term of this patent is extended or adjusted under 35 U.S.C. 154(b) by 0 days.

(21) Appl. No.: 14/967,713

(22) Filed: Dec. 14, 2015

(65) Prior Publication Data

US 2016/0112212 A1    Apr. 21, 2016

Related U.S. Application Data

(63) Continuation of application No. 14/326,576, filed on Jul. 9, 2014, now Pat. No. 9,245,227, which is a
(Continued)

(51) Int. Cl.
*G06N 5/02* (2006.01)
*H04L 12/18* (2006.01)
(Continued)

(52) U.S. Cl.
CPC ........ *H04L 12/1822* (2013.01); *G06F 3/0484* (2013.01); *G06F 17/30* (2013.01); *G06N 5/02* (2013.01)

(58) Field of Classification Search
None
See application file for complete search history.

(56) References Cited

U.S. PATENT DOCUMENTS

| 4,949,085 A | * | 8/1990 | Fisch | G08B 3/105 |
| | | | | 340/7.52 |
| 5,559,957 A | * | 9/1996 | Balk | G06F 11/1435 |
| | | | | 713/2 |

(Continued)

FOREIGN PATENT DOCUMENTS

CN    1909650 B  *  6/2011

OTHER PUBLICATIONS

Vyou, About VYou, http://web.archive.org/web/20101103201420/http:/www.vyou.com/about (webpage states date of Nov. 3, 2010).
(Continued)

*Primary Examiner* — Paulinho E Smith
(74) *Attorney, Agent, or Firm* — Aleksandr Gilshteyn; Lansing Lights LLC

(57) ABSTRACT

A request to join a live AMA session that is already in progress may be obtained from an AMA participant. Automatic playback of video recordings of an expert's answers to questions that have already been answered by the expert may be facilitated for the AMA participant. A current question that is currently being answered by the expert may be determined. A current question visualization that informs the AMA participant that an answer to the current question is currently being recorded by the expert may be generated. A video recording of the expert's answer to the current question may be obtained and automatic playback of the video recording of the expert's answer to the current question may be facilitated for the AMA participant.

15 Claims, 11 Drawing Sheets

EXEMPLARY EXP USAGE SCENARIO

Related U.S. Application Data continuation-in-part of application No. 13/792,817, filed on Mar. 11, 2013, now abandoned.

(60) Provisional application No. 61/611,256, filed on Mar. 15, 2012.

(51) Int. Cl.
*G06F 17/30* (2006.01)
*G06F 3/0484* (2013.01)

(56) References Cited

U.S. PATENT DOCUMENTS

| | | | | | |
|---|---|---|---|---|---|
| 5,673,369 | A * | 9/1997 | Kim | | G06N 5/022 706/59 |
| 6,212,555 | B1 * | 4/2001 | Brooks, Jr. | | G06Q 30/02 348/E7.071 |
| 8,484,181 | B2 * | 7/2013 | Levin | | G06F 17/30867 707/706 |
| 8,549,076 | B2 * | 10/2013 | Mizrahi | | A63F 13/10 709/205 |
| 8,682,667 | B2 * | 3/2014 | Haughay | | G10L 15/22 704/246 |
| 8,768,702 | B2 * | 7/2014 | Mason | | G06F 3/0482 345/177 |
| 8,862,252 | B2 * | 10/2014 | Rottler | | G06F 3/0482 700/91 |
| 2001/0024497 | A1 * | 9/2001 | Campbell | | H04M 3/5125 379/265.09 |
| 2003/0227479 | A1 * | 12/2003 | Mizrahi | | A63F 13/10 715/753 |
| 2005/0060301 | A1 * | 3/2005 | Seki | | G06F 17/30654 |
| 2005/0135333 | A1 * | 6/2005 | Rojas | | H04L 12/581 370/352 |
| 2005/0210394 | A1 * | 9/2005 | Crandall | | H04L 12/1831 715/752 |
| 2006/0083360 | A1 * | 4/2006 | Moore | | H04M 3/5307 379/88.14 |
| 2007/0143493 | A1 * | 6/2007 | Mullig | | G06F 17/30017 709/232 |
| 2007/0190516 | A1 * | 8/2007 | An | | G09B 7/00 434/350 |
| 2008/0255895 | A1 * | 10/2008 | Rajamony | | G06Q 10/06313 705/7.23 |
| 2009/0015672 | A1 * | 1/2009 | Clapp | | G06F 17/30817 348/143 |
| 2009/0162824 | A1 * | 6/2009 | Heck | | G06Q 10/10 434/322 |
| 2010/0235343 | A1 * | 9/2010 | Cao | | G06F 17/30864 707/710 |
| 2011/0040592 | A1 | 2/2011 | Kurtzig et al. | | |
| 2011/0212430 | A1 * | 9/2011 | Smithmier | | G09B 5/06 434/322 |
| 2011/0231234 | A1 * | 9/2011 | Gobel | | G06Q 30/02 705/14.13 |
| 2012/0095977 | A1 * | 4/2012 | Levin | | G06Q 30/02 707/706 |
| 2012/0095978 | A1 * | 4/2012 | Levin | | G06Q 30/02 707/706 |
| 2012/0197970 | A1 * | 8/2012 | Arturi | | G06F 17/3089 709/203 |
| 2012/0242845 | A1 * | 9/2012 | Tan | | H04N 1/00413 348/207.1 |
| 2013/0171605 | A1 * | 7/2013 | Tang | | G09B 5/00 434/352 |
| 2013/0246327 | A1 * | 9/2013 | Tabrizi | | G06N 5/022 706/50 |
| 2014/0038725 | A1 * | 2/2014 | Mizrahi | | A63F 13/10 463/42 |
| 2014/0324757 | A1 * | 10/2014 | Tabrizi | | G06F 17/30 706/50 |
| 2014/0359540 | A1 * | 12/2014 | Kelsey | | G06F 3/017 715/863 |
| 2014/0379826 | A1 * | 12/2014 | Hertz | | H04L 51/046 709/206 |

OTHER PUBLICATIONS

Vyou, People—VYou, http://web.archive.org/web/20101112142820/http:/vyou.com/people (webpage states date of Nov. 12, 2010).

Office Action for U.S. Appl. No. 13/792,817, mailed Feb. 4, 2015.

Office Action for U.S. Appl. No. 14/326,576, mailed Feb. 23, 2015.

Notice of Allowance for U.S. Appl. No. 14/326,576, mailed Sep. 15, 2015.

Liu et al., "Predicting Information Seeker Satisfaction in Community Question Answering", Jul. 24, 2008, SIGIR, pp. 483-490.

MailVu, "Answers to Your Webcam Questions", May 4, 2010, pp. 1-5. (website: http://blog.mailvu.com/blog/answers-to-your-webcam-questions/).

VideoMessage, "Lets Record Your Message!", Jun. 2, 2010, pp. 1-2 (website: http://www.videomessageonline.com/video-message-online-record).

Parnell et al., "BioStar: An Online Question & Answer Resource for BioInformatics Community", Oct. 2011, PLOS Computational Biology, vol. 7 Issue 10, pp. 1-5.

University of Miami (Miami), "Voicemail Services", May 24, 2011, website url: http://www.miami.edu/index.php/telecommunications/faculty_staff_services/voicemail, pp. 1.

Lui et al., "You've Got Answers:Toward Personalized Models for Prediction Success in Community Question Answering", 2008, Proceedings of ACL, pp. 97-100.

Daphne Raban, "Self-Presentation and the Value of Information in Q&A Websites", 2009, Journal of the American Society for Information Science and Technology, 60(12), pp. 2465-2473.

Netzero (websites: http://help.netzero.net/support/email/wm-vmake-61.html), "Email: Sending and Receiving Videos", Feb. 16, 2010, pp. 1-2.

Blanchard et al., "Human Factors and Voice Interactive Systems", 2008, Springer Science, pp. 208-209.

* cited by examiner

EXEMPLARY EXP USAGE SCENARIO

EXEMPLARY EXP QUESTION ANSWERING (QA) COMPONENT

EXEMPLARY EXP DATA FLOW

EXEMPLARY EXP EXPERT DETERMINING (ED) COMPONENT

EXEMPLARY EXP ANSWER OBTAINING (AO) COMPONENT

EXEMPLARY EXP ANSWER SORTING (AS) COMPONENT

EXEMPLARY EXP AMA USAGE SCENARIO

EXEMPLARY EXP AMA FACILITATING (AF) COMPONENT

EXEMPLARY EXP AMA DATA FLOW

EXEMPLARY EXP AMA QUESTION OBTAINING (AQO) COMPONENT

EXEMPLARY EXP COORDINATOR

EXPERT ANSWER PLATFORM METHODS, APPARATUSES AND MEDIA

This disclosure describes EXPERT ANSWER PLATFORM METHODS, APPARATUSES AND MEDIA (hereinafter "EXP"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

CROSS-REFERENCE TO RELATED APPLICATIONS

This is a Continuation of prior U.S. patent application Ser. No. 14/326,576, filed Jul. 9, 2014, entitled "EXPERT ANSWER PLATFORM METHODS, APPARATUSES AND MEDIA," docket no. 1300-101CP1, to which priority under 35 U.S.C. §120 is claimed, and which is a Continuation-In-Part of prior U.S. patent application Ser. No. 13/792,817, filed Mar. 11, 2013, entitled "EXPERT ANSWER PLATFORM METHODS, APPARATUSES AND MEDIA,"to which priority under 35 U.S.C. §120 is claimed, and which claims priority under 35 U.S.C. §119 to U.S. provisional patent application No. 61/611,256, filed Mar. 15, 2012, entitled "EXPERT ANSWER PLATFORM METHODS, APPARATUSES AND MEDIA," docket no. 1300-101PV.

The entire contents of the aforementioned applications are herein expressly incorporated by reference in their entirety.

FIELD

The present disclosure is directed generally to content platforms.

BACKGROUND

Various data sources are available to people seeking information regarding a subject. One source of information is traditional media such as books, magazines, newspapers, radio and television. Another source of information is online publications such as websites and blogs.

BRIEF DESCRIPTION OF THE FIGURES

The accompanying figures and/or appendices illustrate various exemplary embodiments in accordance with the present disclosure.

APPENDIX 1 illustrates additional exemplary embodiments of the EXP.

DETAILED DESCRIPTION

Introduction

Despite the myriad sources of on-demand information available to the public today, the accuracy and quality of much of this information is questionable. There is no guarantee that any online content originates from sources that are authoritative or have any pertinent education or knowledge. The EXP introduces a new type of content platform that delivers expert answers to crowd-sourced user questions. Using the EXP, experts may provide answers (e.g., in the form of video-blogs, in the form of live video ask-me-anything (AMA) sessions) to such crowd-sourced user questions. The EXP may also serve as a marketing platform for experts. Experts may conduct live AMA sessions, post entries on topical issues in their area of expertise, build a following among the public, promote the expert's books and/or research, obtain funding for their activities, and/or the like.

DETAILED DESCRIPTION OF THE EXP

Figure 1:
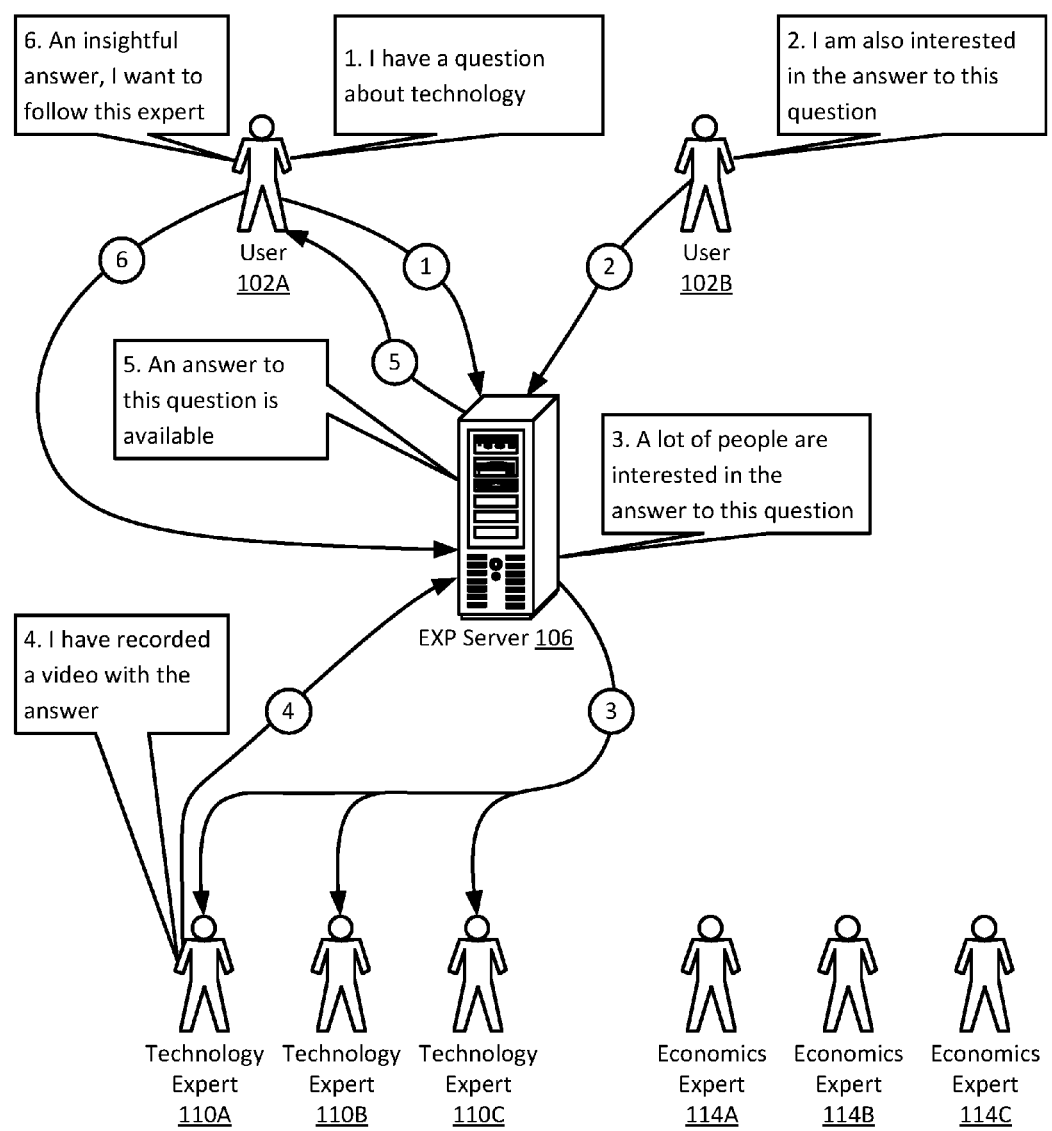
FIG. 1 shows an exemplary usage scenario in one embodiment of the EXP.

FIG. 1 shows an exemplary usage scenario in one embodiment of the EXP. In FIG. 1, a user 102A may have a question regarding a topic (e.g., technology). The user may ask the question via the EXP Server 106 to obtain an answer from an expert. Another user 102B may also be interested in the answer to this question. The other user may utilize the EXP Server to indicate interest in having the question answered (e.g., by voting for the question).

The EXP Server may prompt one or more experts to answer the question. The EXP Server may contact those experts who are best suited to answer the question. For example, the EXP Server may contact technology experts 110A-C to answer questions regarding technology. In another example, the EXP Server may contact economics experts 114A-C to answer questions regarding economics, but may not contact economics experts to answer questions regarding technology. The EXP Server may prompt experts to answer the question once enough users indicate interest in having the question answered (e.g., to ensure that experts are asked high quality questions), or may sort questions such that the questions with the most user interest are presented to experts first (e.g., to make it convenient for experts to answer high quality questions).

One or more experts (e.g., technology expert 110A) may provide a video recording with an answer via the EXP Server. An expert may provide the answer at a time and place that is convenient to the expert, and may embed supporting materials (e.g., images, links to websites) in the answer. Post-processing may be applied to answers to ensure consistent video and/or audio quality.

The EXP Server may inform users who are interested in having the question answered that an answer to the question is available. For example, the EXP Server may send such users an email. In another example, such users may check to see if any new answers to the question are available via a website.

If a user finds an answer insightful, the user may wish to follow the expert who provided the answer. For example, following the expert may facilitate alerting the user when the expert answers other questions. In another example, following the expert may facilitate informing the user regarding the expert's activities (e.g., books written by the expert) and/or helping the user support such activities (e.g., purchase the expert's book). Furthermore, the EXP may facilitate sharing the answer with and/or recommending the expert to the user's EXP friends and/or via Facebook, Twitter, email, and/or the like.

Figure 2:
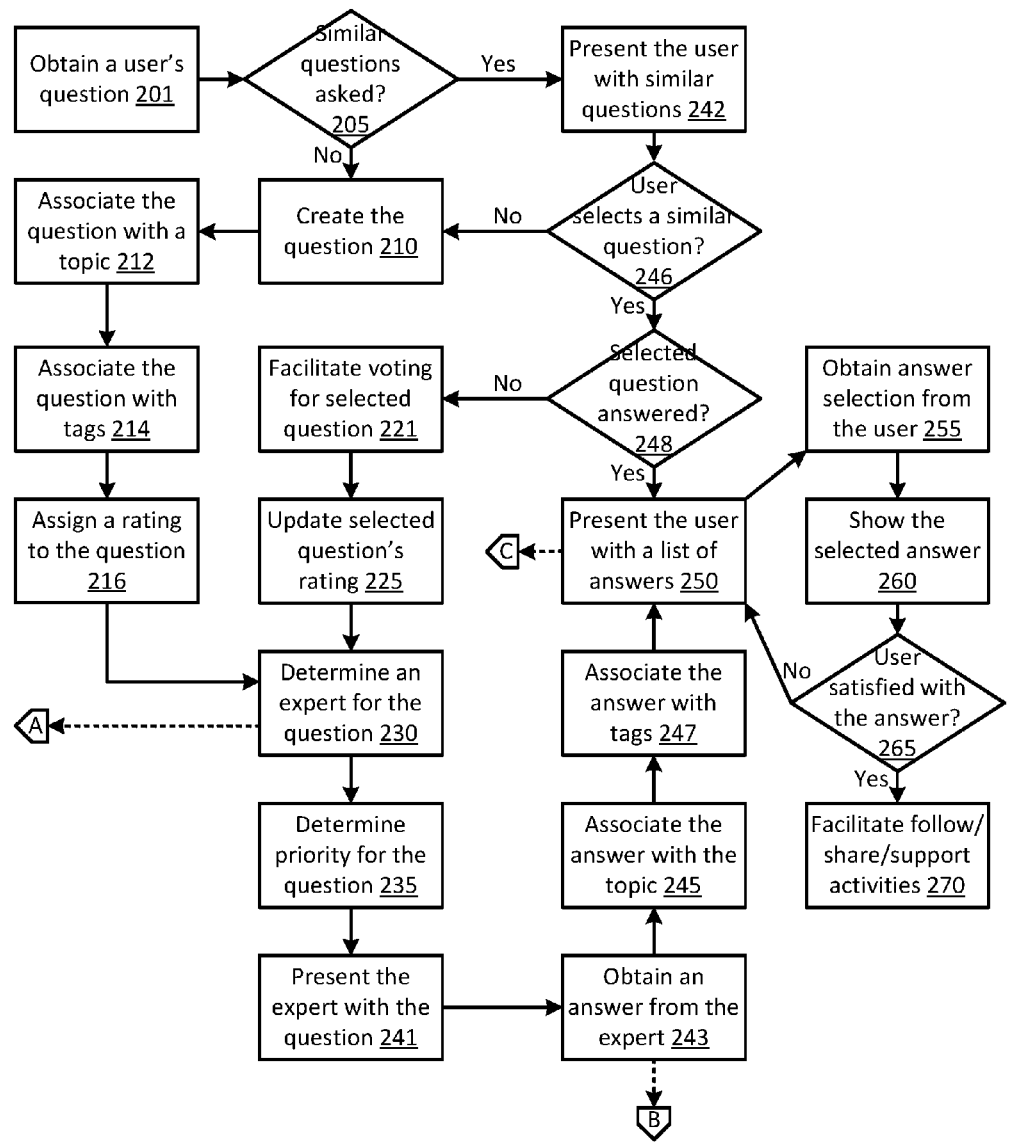
FIG. 2 shows a logic flow diagram illustrating an exemplary question answering (QA) component in one embodiment of the EXP.

FIG. 2 shows a logic flow diagram illustrating an exemplary question answering (QA) component in one embodiment of the EXP. In FIG. 2, a question from a user may be obtained at 201. The user may provide a question via a client (e.g., a desktop, a laptop, a tablet, a smart phone, and/or the like). In one embodiment, the user may input a question in a textual and/or graphical form. For example, the user may type in a question and/or provide a picture (e.g., as supporting information). In another embodiment, the user may input a question in an audio and/or video form. For example, the user may use a microphone and/or a webcam to record a question. In some implementations, an audio and/or video question may be converted to a textual form (e.g., using speech recognition software).

A determination may be made at 205 whether other questions have been asked that are similar to the question obtained from the user. In one embodiment, a textual search may be performed by the EXP to make this determination. For example, a full-text search may be performed via MySQL using one or more SQL commands substantially in the following form:

```
SELECT *
FROM Questions
    WHERE MATCH(QuestionContent) AGAINST("user's question")
```

In another embodiment, topics and/or tags associated with the user's question may be used by the EXP to make this determination. For example, topics and/or tags associated with the user's question may be compared to topics and/or tags associated with existing questions to find questions that have the most topics and/or tags in common with the user's question.

If similar questions have been asked, the EXP may present the user with similar questions at 242. For example, the EXP may present the user with a list of similar questions via a GUI widget (e.g., a dropdown box). In one implementation, as the user types in a question, the EXP may update the list of similar questions and the user may click on one of the similar questions to select it. A determination may be made at 246 whether the user selected one of the similar questions. If the user did not select a similar question or if similar questions have not been asked, the EXP may create a question at 210. For example, the EXP may add the user's question to a data store (e.g., a questions data store 1130c) via one or more SQL statements substantially in the following form:

```
INSERT INTO Questions (QuestionID, QuestionContent)
    VALUES ("question identifier", "user's question")
```

The user's question may be associated with one or more topics at 212. For example, topics may include art, history, science, business, technology, literature, music, politics, and/or the like. In one embodiment, topics may be predefined by the EXP (e.g., via a topics data store 1130e). In another embodiment, topics may be defined by users. In various implementations, topics may include a one-level structure, a two-level structure (e.g., topics and sub-topics), a multi-level structure, and/or the like. In one embodiment, the EXP may assign one or more topics to the user's question (e.g., using keyword analysis). For example, keywords may be associated with topics (e.g., the keyword "laptop" may be associated with the topic "technology") and questions may be assigned a topic based on keywords in the question. In another embodiment, the user may assign one or more topics to the user's question (e.g., by selecting one or more of the predefined topics and/or sub-topics via a GUI). For example, the entry for the user's question in the questions data store may be associated with assigned topics from the topics data store via one or more SQL statements substantially in the following form:

```
UPDATE Questions
    SET QuestionTopics="Technology"
    WHERE QuestionID="question identifier"
```

The user's question may be associated with one or more tags at 214. For example, tags may include keyword tags, social networking tags (e.g., Twitter hash tags, Facebook tags), and/or the like. In one embodiment, tags may be predefined by the EXP (e.g., via a tags data store 1130f). In another embodiment, tags may be defined by users. In one embodiment, the EXP may assign one or more tags to the user's question (e.g., using keyword analysis). For example, keywords may be associated with tags (e.g., the keyword "laptop" may be associated with the tag "computer") and questions may be assigned tags based on keywords in the question. In another embodiment, the user may assign one or more tags to the user's question (e.g., by specifying one or more tags). For example, the entry for the user's question in the questions data store may be associated with assigned tags from the tags data store via one or more SQL statements substantially in the following form:

```
UPDATE Questions
    SET QuestionTags="computer"
    WHERE QuestionID="question identifier"
```

The user's question may be assigned a rating at 216. The rating may indicate interest in, importance of, urgency of, and/or the like of the user's question. For example, one or more SQL statements may be used to store the rating in the questions data store. In one embodiment, a question may be assigned a predefined rating associated with new questions (e.g., a rating of 1). In another embodiment, a question (e.g., associated with a topic) may be assigned a rating that varies based on the characteristics of the user who asked the question (e.g., if the question was asked by a user who is an expert in the topic, the question may get a higher rating of 2). In yet another embodiment, the user may indicate the user's interest in having a question answered and/or the priority assigned to a question by the user (e.g., a low interest/priority question may get a rating of 0.5, a medium interest/priority question may get a rating of 1, a high interest/priority question may get a rating of 1.5).

If the user did select a similar question at 246, a determination may be made at 248 whether the selected question has been answered. If the selected question has not been answered, the EXP may facilitate voting for the selected question at 221. Voting for a question allows a user to indicate interest in having the question answered by an expert. In one embodiment, the user may use a GUI widget (e.g., a "Vote" button) to vote for a question. In one implementation, the user may be offered an opportunity to vote for a question. In another implementation, the user may be offered an opportunity to express the level of interest in having a question answered and/or the priority assigned to a question by the user.

The rating associated with the selected question may be updated at 225. In one embodiment, the rating associated with a question may be updated by a predefined amount associated with having an additional user vote for a question (e.g., increased by 1). In another embodiment, the rating associated with a question (e.g., associated with a topic) may be updated based on the characteristics of the user who voted for the question (e.g., if the question was voted for by an expert on the topic, the question's rating may be increased by 2). In yet another embodiment, the rating associated with a question may be updated based on the voter's level of interest in having a question answered and/or the priority assigned to a question by the user. For example, the rating may be increased by 0.5 for a low interest/priority question, by 1 for a medium interest/priority question, and by 1.5 for a high interest/priority question. In one implementation, the rating associated with the selected question may be updated via one or more SQL statements substantially in the following form:

```
UPDATE Questions
SET QuestionRating="new rating"
WHERE QuestionID="question identifier"
```

One or more experts who may be well suited to answering the outstanding question (i.e., either the user's question or the similar question selected by the user) may be determined at 230. It is to be understood that the term "expert" refers generally to EXP users who are well qualified to answer questions on one or more topics. For example, experts may include subject matter experts (e.g., academics, industry experts), business leaders, celebrities, intellectuals, public officials, politicians, and/or the like. In one implementation, the user may direct the question to one or more experts chosen by the user. For example, the user may click an "Ask a Question" button on the profile page of the expert whom the user wishes to ask the question. In another implementation, the EXP may determine one or more best-rated experts using a variety of factors associated with each expert. In one embodiment, an expert's established reputation may be assessed. For example, the number and/or character of the expert's awards, peer reviews, media reviews, and/or the like may be evaluated. In another embodiment, the expert's field of expertise may be assessed. For example, the expert's field of research, the number and/or character of publications, the number of years spent in the field, and/or the like may be evaluated. In yet another embodiment, the level of the expert's public engagement may be assessed. For example, the expert's interest in and/or track record of participating in public discourse may be evaluated. In yet another embodiment, the expert's social impact may be assessed. For example, the expert's communication skills (e.g., reputation for explaining complex topics) may be evaluated. In one implementation, ratings (e.g., numerical ratings) may be assigned to experts based on the assessment of one or more of the above factors (e.g., overall ratings, ratings for each topic and/or subtopic and/or tag). In another implementation, ratings may be assigned to experts based on self assessment of expertise by preapproved experts. One or more best-rated experts (e.g., having highest numerical rating with regard to the topic associated with the outstanding question) may be selected to provide answers. See FIG. 4 for additional detail regarding determining one or more experts to answer a question.

Priority associated with the outstanding question may be determined at 235. Such priority may be determined based on the rating associated with the outstanding question. For example, questions that are highly rated may be considered to have higher priority since these questions may be of higher interest to EXP users. In one embodiment, the priority associated with the outstanding question may determine how the outstanding question is presented to an expert. For example, upon login, an expert may be presented with a list of questions sorted based on question priority. In another example, questions with a higher priority may be displayed more prominently (e.g., questions may be highlighted using different colors based on their priority, questions whose rating exceeds a predefined threshold may be highlighted). In another embodiment, the priority associated with the outstanding question may determine how an expert is alerted regarding the outstanding question. For example, the expert may be alerted and/or reminded that a question is awaiting the expert's response based on the question's priority (e.g., the frequency of alerts and/or reminders sent to the expert regarding a question may vary based on the question's priority, the expert may be sent alerts and/or reminders regarding those questions whose priority exceeds a predefined threshold).

An expert associated with the outstanding question may be presented with the outstanding question at 241. In one embodiment, the expert may select the outstanding question from a list of questions assigned to the expert (e.g., via a webpage) and view, listen to, and/or the like the outstanding question. In another embodiment, an electronic communication (e.g., an email) with the outstanding question may be sent to the expert.

The EXP may obtain an answer to the outstanding question from the expert at 243. For example, the answer may be stored in an answers data store 1130*d*. In various embodiments, the answer may be a video-blog, an audio recording, a textual response, and/or the like. For example, the expert may use his client (e.g., a tablet with a webcam) to record and/or post a video-blog answer at his chosen time and/or location. See FIG. 5 for additional detail regarding obtaining the answer from the expert. In some embodiments, the expert may choose to share the answer with the expert's social network (e.g., via Facebook, via Twitter). In some embodiments, the expert's answer may be a response to an answer to the outstanding question provided by another expert. For example, if a user is an expert on the topic associated with the outstanding question, the user may see a "Respond" button that allows the user to record a response to another expert's answer. Accordingly, the EXP may provide an asynchronous debate venue in which different experts may present different views.

The answer may be associated with the answered question and thus may be associated with the topic at 245 and/or with the tags at 247 associated with the answered question. In some embodiments, the expert may associate the answer and thus the question with additional and/or alternative topics at 245 and/or tags at 247. In some embodiments, the user who asked the question may be allowed to associate the question with topics, while the expert may be allowed to associate the answer and thus the question with tags.

If, at 248, it is determined that the selected question has been answered, or if the outstanding question has been answered by an expert, the EXP may present the user with a list of answers to the answered question at 250. In some embodiments, the answers may be sorted (e.g., based on the date the answer was provided, based on the answer's popularity). See FIG. 6 for additional detail regarding presenting the user with answers. For example, if multiple experts provided answers, the user may choose which answer to view (e.g., by selecting an answer to view via a GUI).

The EXP may obtain a selection of an answer to view from the user at 255 and may present the selected answer to the user at 260. For example, the EXP may facilitate showing the user the selected video-blog answer. A determination may be made at 265 whether the user is satisfied with the selected answer. If the user indicates that the user is not satisfied (e.g., the answer is not clear, the user wishes to view other answers) with the selected answer, the user may be presented with a list of answers at 250 and provided with an opportunity to select a different answer.

If the user is satisfied with the answer the EXP may facilitate a variety of activities at 270. In one embodiment, the EXP may facilitate sharing the answer with and/or recommending the expert to the user's social network. For example, the EXP may facilitate sharing the answer with and/or recommending the expert to the user's EXP friends and/or via Facebook, Twitter, email, and/or the like. In another example, the user may post comments regarding questions and/or answers.

In another embodiment, the EXP may facilitate following of the expert and/or of the topic by the user. For example, if the user chooses to follow the expert, the EXP may provide the user with a readily accessible link (e.g., on the user's homepage) to the expert's profile page, alerts regarding activities of the expert, and/or the like. The user may access the expert's profile page to view the expert's posts on topical issues in the expert's area of expertise, to view answers to other questions answered by the expert, to view the expert's media articles and/or interviews, to ask the expert follow up questions regarding the question, and/or the like. In another example, if the user chooses to follow a topic, the EXP may provide the user with a readily accessible link to other questions and/or answers associated with the topic.

In yet another embodiment, the EXP may facilitate user support of the expert. For example, the expert's profile page may provide information regarding the expert's curriculum vitae (CV), books (e.g., based on the list of expert's books obtained via an online bookstore's API using keywords), podcasts, research, articles, speaking activities, and/or the like. The EXP may serve as a funding channel for the expert by facilitating the purchase of such materials (e.g., books), by facilitating user funding (e.g., donations or other micropayments) for various (e.g., research) activities, causes, non-profit organizations, and/or the like that the expert wishes to engage in and/or support. For example, an expert may post on the expert's profile page that the expert wishes to undertake a research project to examine tax policies in Toronto. The expert may specify the amount of funding requested and/or the time in which the funding has to be obtained in order for the research project to commence.

Figure 3:
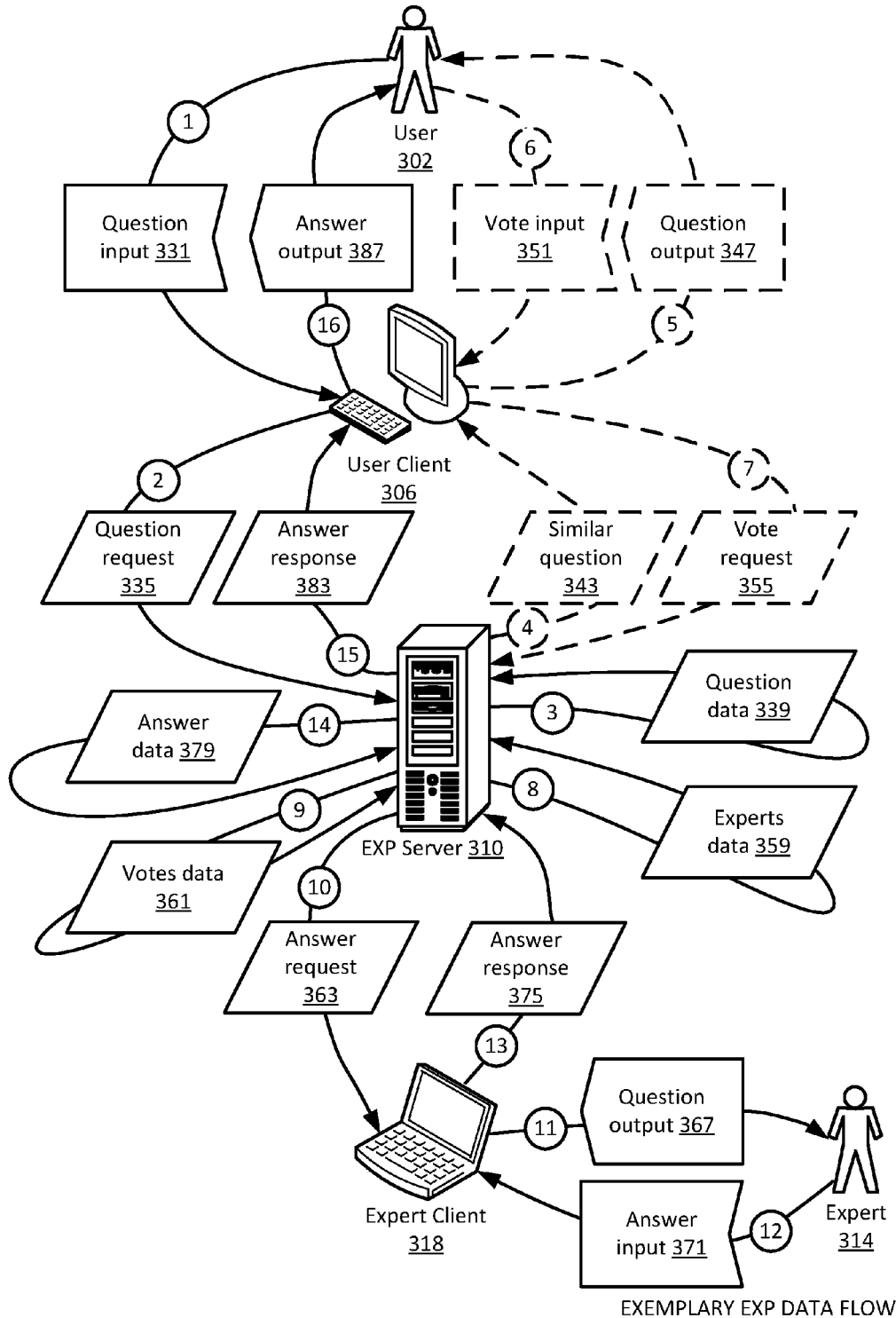
FIG. 3 shows a data flow diagram in one embodiment of the EXP.

FIG. 3 shows a data flow diagram in one embodiment of the EXP. In FIG. 3, dashed lines indicate data flow elements that may be more likely to be optional. FIG. 3 provides an example of how data may flow to, through, and/or from the EXP to obtain an answer to a user's question from an expert. In FIG. 3, the user 302 may input a question 331 into the user's client 306. For example, the user may type in a question. The user's client may communicate a question request 335 to the EXP server 310. For example, the question request 335 may include data such as the user's ID, question content, topics, tags, and/or the like, and may be in XML format substantially in the following form:

```
<XML>
    <QuestionRequest>
        <UserID>ID_User2</UserID>
        <QuestionID>ID_Question2</QuestionID>
        <QuestionContent>user's question</QuestionContent>
        <QuestionTopic>Technology</QuestionTopic>
    </QuestionRequest>
</XML>
```

The EXP server may analyze question data 339 to determine topics and/or tags that should be associated with the question. The EXP server may also analyze question data 339 to determine whether other questions have been asked that are similar to the question obtained from the user. For example, the question data may include question keywords, topics, tags, and/or the like.

If similar questions have been asked and the user selects a similar question, data regarding the similar question 343 may be provided to the user's client. For example, data regarding the similar question 343 may include question ID, question content, question rating, and/or the like, and may be in XML format substantially in the following form:

```
<XML>
    <SimilarQuestion>
        <QuestionID>ID_Question1</QuestionID>
        <QuestionContent>user's question</QuestionContent>
        <QuestionTopic>Technology</QuestionTopic>
        <QuestionRating>5</QuestionRating>
    </SimilarQuestion>
</XML>
```

The similar question may be output 347 to the user. For example, the user may read the question on the client's display. If the similar question interests the user, the user may input a vote 351 for the similar question (e.g., by clicking a "Vote" button). The user's client may communicate a vote request 355 to the EXP server to inform the EXP server that the user voted for the similar question. For example, the vote request 355 may include data such as the user's ID, question ID, vote indicator, vote amount (e.g., low/medium/high interest), and/or the like, and may be in XML format substantially in the following form:

```
<XML>
    <VoteRequest>
        <UserID>ID_User2</UserID>
        <QuestionID>ID_Question1</QuestionID>
        <Vote>increase rating by 2</Vote>
    </VoteRequest>
</XML>
```

The EXP server may analyze experts data 359 to determine which experts should be asked to answer the question. For example, the experts data may include experts' IDs, experts' overall ratings, experts' topic ratings, experts' sub-topic ratings, and/or the like. The EXP server may analyze votes data 361 to determine priority for the question. For example, votes data may include question ID, question rating, vote indicators, vote amounts, and/or the like.

If the expert 314 decides to answer a question (e.g., by selecting a question to answer from a list of questions assigned to the expert), an answer request 363 may be sent to the expert's client 318. For example, the answer request 363 may include data such as question ID, question content, question priority, and/or the like, and may be in XML format substantially in the following form:

```
<XML>
    <AnswerRequest>
        <QuestionID>ID_Question1</QuestionID>
        <QuestionContent>user's question</QuestionContent>
        <QuestionTopic>Technology</QuestionTopic>
        <QuestionRating>7</QuestionRating>
    </AnswerRequest>
</XML>
```

The question may be output 367 to the expert. For example, the expert may view the question on the client's display. The expert may use the client to input an answer 371 to the question. For example, the expert may use a computer with a webcam to record a video-blog answer. The expert's client may provide an answer response 375 to the EXP server. For example, the answer response may include data such as question ID, answer ID, answer content, background template, media, topics, tags, expert ID, and/or the like, and may be in XML format substantially in the following form:

```
<XML>
    <AnswerResponse>
        <QuestionID>ID_Question1</QuestionID>
        <AnswerID>ID_Answer1</AnswerID>
        <AnswerContent>expert's answer</AnswerContent>
        <AnswerTopic>Technology</AnswerTopic>
        <AnswerTag>Computers</AnswerTag>
        <BackgroundTemplate>ComputerTechnology1</BackgroundTemplate>
        <Media>ComputerImage1</Media>
        <ExpertID>ID_Expert1</ExpertID>
    </AnswerResponse>
</XML>
```

The EXP server may analyze answer data 379 to convert the answer into an appropriate format (e.g., convert MPEG2 video format provided by the expert into 11.264 video format), to determine whether the answer should be associated with additional topics and/or tags, and/or the like. For example, the answer data may include question ID, answer ID, answer format, topics, tags, and/or the like.

If the user selects an answer that the user is interested in viewing, the EXP server may provide an answer response 383. The answer response may include data such as answer ID, answer content, answer rating, expert ID, and/or the like, and may be in XML format substantially in the following form:

```
<XML>
    <AnswerResponse>
        <AnswerID>ID_Answer1</AnswerID>
        <AnswerContent>expert's answer</AnswerContent>
        <AnswerRating>4</AnswerRating>
        <ExpertID>ID_Expert1</ExpertID>
    </AnswerResponse>
</XML>
```

The answer may be output 387 to the user. For example, the client may play back the video-blog answer to the user.

Figure 4:
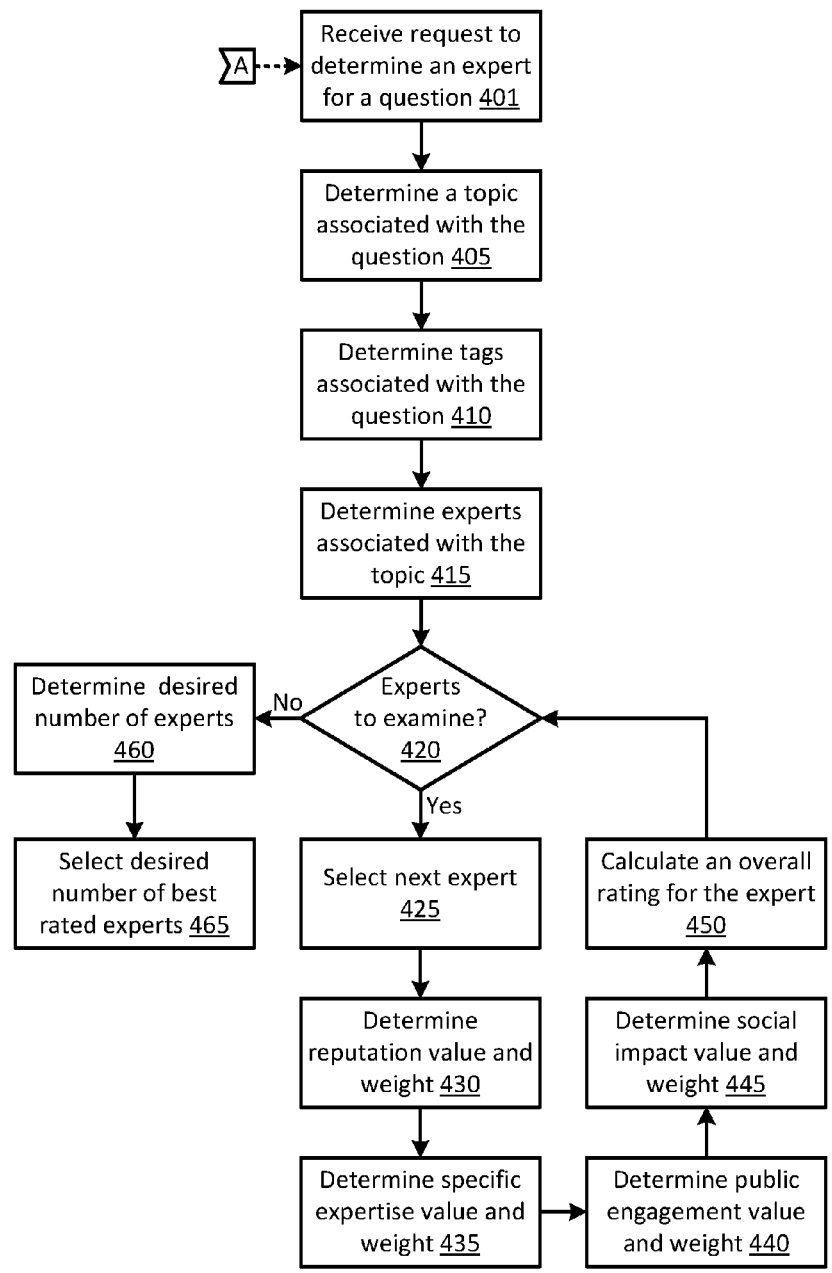
FIG. 4 shows a logic flow diagram illustrating an exemplary expert determining (ED) component in one embodiment of the EXP.

FIG. 4 shows a logic flow diagram illustrating an exemplary expert determining (ED) component in one embodiment of the EXP. In FIG. 4, a request to determine an expert for a question may be received at 401. For example, the request to determine an expert for a question may be received via a C++ function call as a result of a user asking a new question (e.g., a question regarding a topic, a question asked during an AMA session).

One or more topics associated with the question may be determined at 405. For example, the request to determine an expert for a question may include an identifier of the question, which may be utilized to retrieve the one or more topics associated with the question (e.g., from the questions data store 1130c) via one or more SQL statements substantially in one of the following forms:

```
SELECT QuestionTopics
FROM Questions
WHERE QuestionID="identifier of the question"
SELECT QuestionTopics
FROM AMASessionQuestions
WHERE QuestionID="identifier of the AMA question"
```

One or more tags associated with the question may be determined at 410. For example, the identifier of the question may be utilized to retrieve the one or more tags associated with the question (e.g., from the questions data store 1130c) via one or more SQL statements substantially in one of the following forms:

```
SELECT QuestionTags
FROM Questions
WHERE QuestionID="identifier of the question"
SELECT QuestionTags
FROM AMASessionQuestions
WHERE QuestionID="identifier of the AMA question"
```

One or more experts associated with the one or more topics and/or the tags may be determined at 415. In one embodiment, experts may specify topics in which they consider themselves experts (e.g., upon signup with the EXP, upon committing to answer questions during an AMA session), and an expert who specifies a topic associated with the question may be examined to determine whether the expert is one of the best rated experts for the topic. In another embodiment, an expert identified by others (e.g., other experts) as an expert in a topic associated with the question may be examined to determine whether the expert is one of the best rated experts for the topic. In yet another embodiment, any EXP expert (e.g., any user who is an expert, any expert answering questions during an AMA session) may be examined to determine whether the expert is one of the best rated experts for the topic. For example, experts associated with a topic may be determined (e.g., based on data from the users data store 1130*a*) via one or more SQL statements substantially in one of the following forms:

```
SELECT UserID
FROM Users
WHERE (IsExpert="TRUE") AND (ExpertTopics=QuestionTopics)
SELECT UserID
FROM AMASessionExperts
WHERE ExpertTopics=QuestionTopics
```

A determination may be made at 420 whether there remain experts to examine (e.g., have the determined experts been examined). If there remain experts to examine, the next expert may be selected at 425. For example, the next expert may be selected by iterating through the results of executing the SQL query. Information regarding the expert (e.g., information regarding the expert's established reputation, field of expertise, level of public engagement, social impact) may be obtained from a variety of source (e.g., obtained from the users data store 1130*a* by retrieving data submitted by the expert; obtained by crawling the expert's LinkedIn profile, academic publications, Twitter stream, and/or the like; obtained by search through the expert's books via an online bookstore's API using keywords).

The expert's reputation value and/or weight may be determined at 430. For example, the expert's position (e.g., the title of the position), the number and/or character of the expert's awards, peer reviews, media reviews, and/or the like may be utilized to determine the expert's reputation value. In one implementation, the expert's title may be associated with a specified point value (e.g., Assistant Professor may be associated with 1 point, Associate Professor may be associated with 2 points, Professor may be associated with 3 points). In another implementation, each award (e.g., that is relevant to the topic and/or tags associated with the question) may be associated with 1 point. For example, various point values associated with the expert's reputation may be summed to determine a reputation value for the expert (e.g., an Associate Professor with one relevant award may have a reputation value of 3 points). The expert's reputation value may have a weight (e.g., 25%) that specifies how much impact the expert's reputation value should have on the expert's overall rating. For example, the expert's reputation weight may be specified via a configuration parameter.

The expert's specific expertise value and/or weight may be determined at 435. For example, the expert's field of research, the number and/or character of publications, the number of years spent in the field, committee memberships, activities, and/or the like may be utilized to determine the expert's specific expertise value with regard to the topic and/or tags associated with the question. In one implementation, the number of years that the expert spent in the field associated with the topic and/or tags may be associated with a specified point value (e.g., 1 point for each year spent in the field). In another implementation, each publication (e.g., that is relevant to the topic and/or tags associated with the question) may be associated with 1 point. For example, various point values associated with the expert's specific expertise may be summed to determine a specific expertise value for the expert (e.g., an expert with three years in the field and two relevant publications may have a specific expertise value of 5 points). The expert's specific expertise value may have a weight (e.g., 25%) that specifies how much impact the expert's specific expertise value should have on the expert's overall rating. For example, the expert's specific expertise weight may be specified via a configuration parameter.

The expert's public engagement value and/or weight may be determined at 440. For example, the expert's interest in and/or track record of participating in public discourse, publishing books and/or other media (e.g., unrelated to the expert's area of expertise), giving speeches, and/or the like may be utilized to determine the expert's public engagement value. In one implementation, the expert's track record of participating in public discourse (e.g., low, medium, or high participation) may be associated with a specified point value (e.g., 1 point for low participation, 2 points for medium participation, 3 points for high participation). In another implementation, each speech (e.g., that is unrelated to the topic and/or tags associated with the question) may be associated with 0.5 points. For example, various point values associated with the expert's public engagement may be summed to determine a public engagement value for the expert (e.g., an expert with high participation who gave three speeches may have a public engagement value of 4.5 points). The expert's public engagement value may have a weight (e.g., 25%) that specifies how much impact the expert's public engagement value should have on the expert's overall rating. For example, the expert's public engagement weight may be specified via a configuration parameter.

The expert's social impact value and/or weight may be determined at 445. For example, the expert's communication skills (e.g., reputation for explaining complex topics), originality, insight, general recognition, and/or the like may be utilized to determine the expert's social impact value. In one implementation, the expert's general recognition (e.g., low, medium, or high general recognition) may be associated with a specified point value (e.g., 1 point for low general recognition, 2 points for medium general recognition, 3 points for high general recognition). In another implementation, each TV and/or radio appearance may be associated with 1 point. For example, various point values associated with the expert's social impact may be summed to determine a social impact value for the expert (e.g., an expert with medium general recognition and one TV appearance may have a social impact value of 3 points). The expert's social impact value may have a weight (e.g., 25%) that specifies how much impact the expert's social impact value should have on the expert's overall rating. For example, the expert's social impact weight may be specified via a configuration parameter.

An overall rating may be calculated for the expert at 450. In one embodiment, the expert's overall rating may be based on the expert's component values (e.g., reputation value, specific expertise value, public engagement value, social impact value) in accordance with their respective weights. For example, the expert's overall rating may be a weighted average of the expert's component values (e.g., 3*0.25+ 5*0.25+4.5*0.25+3*0.25=3.875 overall rating). In some embodiments, the EXP may not have available data to determine one or more component values for the expert. In one implementation, the EXP may use a default value (e.g., the average of component values of experts whose component values are known) for a missing component value. In another implementation, the EXP may adjust the weights associated with the component values to compensate for unknown data (e.g., if the expert's general reputation value and specific expertise value are known, but public engagement value and social impact value are not known, the EXP may assign 50% weight to each of general reputation value and specific expertise value, and 0% weight to each of public engagement value and social impact value).

If there are no more experts to examine, the desired number of experts may be determined at 460. For example, the EXP may be configured to prompt the top five (e.g., best rated) experts to answer the question. In another example, the EXP may be configured to prompt the best rated expert from a panel of experts to answer the question during an AMA session. In one implementation, the desired number of experts may be specified via a configuration parameter. The desired number of best rated (e.g., having the highest overall rating associated with the question) experts may be selected at 465 to provide answers.

Figure 5:
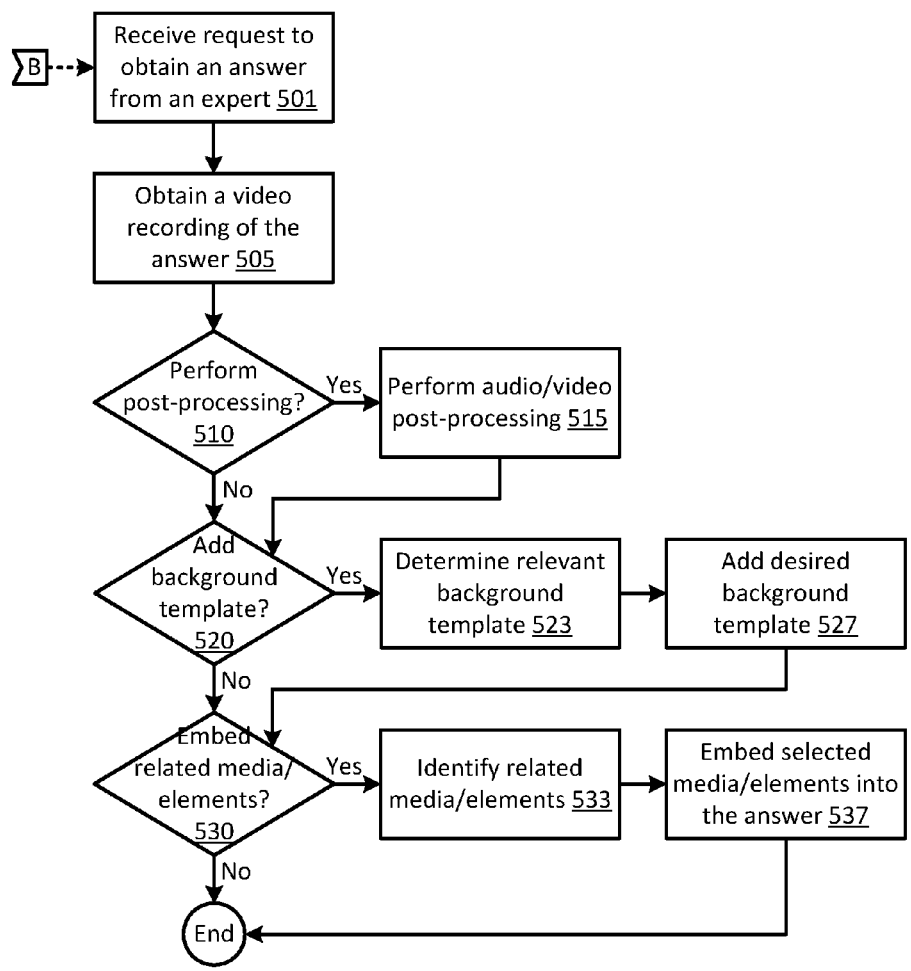
FIG. 5 shows a logic flow diagram illustrating an exemplary answer obtaining (AO) component in one embodiment of the EXP.

FIG. 5 shows a logic flow diagram illustrating an exemplary answer obtaining (AO) component in one embodiment of the EXP. In FIG. 5, a request to obtain an answer from an expert may be received at 501. For example, the expert may click a "Record" button on the EXP website to respond to a question (e.g., a question regarding a topic, a question asked during an AMA session). In another example, the expert may click a "Record" button in a plug-in (e.g., a Chrome plug-in) to respond to a question without leaving the webpage utilized by the expert during an AMA session (e.g., the webpage with a list of AMA questions).

A video recording of the answer may be obtained from the expert at 505. In one embodiment, the expert may record the answer via a web browser (e.g., via an Adobe Flash plug-in, via a Microsoft Silverlight plug-in, via a Chrome plug-in, via a pop-up). In one implementation, the expert may preview the recorded answer and decide whether the expert is satisfied with the answer. If the expert is not satisfied with the answer, the expert may delete the answer and/or re-record the answer. In another embodiment, the expert may upload a prerecorded video of the answer. In some implementations, the answer may have a time limit (e.g., a minimum length, a maximum length).

A determination may be made at 510 whether post-processing should be performed on the obtained video. For example, whether post-processing should be performed may be specified in a configuration parameter. In another example, the expert may indicate whether post-processing should be performed. A variety of post-processing techniques may be used at 515 to perform post-processing. In one embodiment, post-processing techniques may be applied to the video stream. For example, the video stream may be scaled to a specified size and/or resolution (e.g., to ensure a common size and/or resolution for answers). In another embodiment, post-processing techniques may be applied to the audio stream. For example, the audio stream may be normalized (e.g., to ensure a common audio volume level for answers).

A determination may be made at 520 whether a background template should be added to the obtained video. For example, whether a background template should be added to the obtained video may be specified in a configuration parameter. In another example, the expert may indicate whether a background template should be added. If, a background template should be added to the obtained video, one or more relevant background templates may be determined at 523. For example, a background template may provide a background for the video (e.g., a classroom picture background for an answer related to education, a library picture background for an answer related to literature, an audio background appropriate for the topic). In another example, a background template may provide decorative elements (e.g., a decorative frame) for the video. In one embodiment, the relevant background templates may be determined based on a topic and/or a tag associated with the question and the answer. In one implementation, topics and/or tags may be associated with one or more background templates, and the relevant background template may be selected (e.g., from the backgrounds data store 1130g) via one or more SQL statements substantially in the following form:

```
SELECT BackgroundID
FROM Backgrounds
WHERE AssociatedTopic ="identifier of the topic associated
with the question"
```

The desired background template may be added to the video at 527. In one embodiment, the EXP may automatically select a background template to add to the answer (e.g., the relevant background template for the topic associated with the question). In another embodiment, the expert may be presented with an assortment of background templates (e.g., the relevant background templates for the topic associated with the question), and the expert may select a background template to add to the answer.

A determination may be made at 530 whether related media and/or newscast style elements should be embedded into the answer. For example, whether related media and/or newscast style elements should be embedded into the obtained video may be specified in a configuration parameter. In another example, the expert may indicate whether related media and/or newscast style elements should be embedded. If related media and/or newscast style elements should be embedded, related media and/or newscast style elements may be identified at 533. For example, related media may include images, sounds, videos, links, and/or the like. In another example, related newscast style elements may include news tickers, overlaying graphical elements (e.g., logos), overlaying text, and/or the like. In one embodiment, the related media and/or newscast style elements may be identified based on themes and/or concepts associated with the question and/or the answer. In one implementation, the answer may be transcribed into text and analyzed to determine keywords. The media and/or newscast style elements may be associated with keywords, and related media and/or newscast style elements may be identified (e.g., from the media data store 1130h) via one or more SQL statements substantially in the following form:

```
SELECT MediaID
FROM Media
WHERE AssociatedKeywords="keywords associated with the answer"
```

The selected media and/or newscast style elements may be embedded into the video at 537. In one embodiment, the expert may be presented with the identified related media and/or newscast style elements, and the expert may select media and/or newscast style elements to add to the answer (e.g., media and/or newscast style elements that may help the expert answer the question and/or provide additional information).

Figure 6:
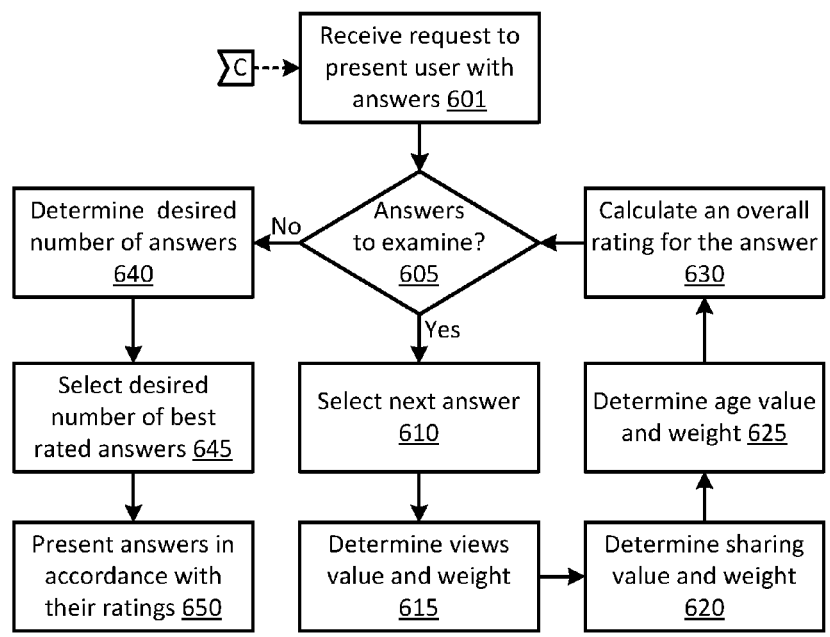
FIG. 6 shows a logic flow diagram illustrating an exemplary answer sorting (AS) component in one embodiment of the EXP.

FIG. 6 shows a logic flow diagram illustrating an exemplary answer sorting (AS) component in one embodiment of the EXP. In FIG. 6, a request to present a user with answers may be received at 601. For example, the request to present a user with answers may specify the answers that should be sorted (e.g., as a list of answer identifiers).

A determination may be made at 605 whether there remain answers to examine (e.g., have the answers been examined). If there remain answers to examine, the next answer may be selected at 610. For example, data regarding the answer may be retrieved (e.g., from the answers data store 1130d) via one or more SQL statements substantially in the following form:

```
SELECT *
FROM Answers
WHERE AnswerID="identifier of the selected answer"
```

The answer's views value and/or weight may be determined at 615. For example, an answer that was viewed by a large number of users may be considered to be more relevant than an answer that was viewed by a small number of users. In one implementation, the number of views may be associated with a specified point value (e.g., 1 point for every ten views). For example, an answer with ten views may have a views value of 1 point. In another example, an answer with twenty five views may have a views value of 2 points. The answer's views value may have a weight (e.g., 40%) that specifies how much impact the answer's views value should have on the answer's overall rating. For example, the answer's views value weight may be specified via a configuration parameter.

The answer's sharing value and/or weight may be determined at 620. For example, an answer that was shared, liked, and/or the like by a large number of users may be considered to be more relevant than an answer that was shared, liked, and/or the like by a small number of users. In one implementation, the number of shares, likes, and/or the like may be associated with a specified point value (e.g., 1 point for every five shares, likes, and/or the like). For example, an answer with ten shares may have a sharing value of 2 points. In another example, an answer with seventeen shares may have a sharing value of 3 points. The answer's sharing value may have a weight (e.g., 30%) that specifies how much impact the answer's sharing value should have on the answer's overall rating. For example, the answer's sharing value weight may be specified via a configuration parameter.

The answer's age value and/or weight may be determined at 625. For example, an answer that was provided a long time ago may be considered to be less relevant than an answer that was provided recently. In one implementation, the age of the answer may be associated with a specified point value (e.g., 3 points for answers provided within the last month, 2 points for answers provided within the last year, 3 points for answers provided within the last five years). For example, an answer provided six months ago may have an age value of 2 points. The answer's age value may have a weight (e.g., 30%) that specifies how much impact the answer's age value should have on the answer's overall rating. For example, the answer's age value weight may be specified via a configuration parameter.

An overall rating may be calculated for the answer at 630. In one embodiment, the answer's overall rating may be based on the answer's component values (e.g., views value, sharing value, age value) in accordance with their respective weights. For example, the answer's overall rating may be a weighted average of the answer's component values. In some implementations, the answer's overall rating may depend on the user's personal preferences. For example, an answer by an expert may have a higher overall rating for a user who follows the expert than for a user who does not follow the expert. In another example, users may follow certain topics and/or tags, and an answer may have a higher overall rating for a user who follows a topic and/or a tag associated with the answer than for a user who does not.

If there are no more answers to examine, the desired number of answers may be determined at 640. For example, the EXP may be configured to present any available answers to the user. In another example, the EXP may be configured to present a specified number of top (e.g., three) answers to the user. In one implementation, the desired number of answers may be specified via a configuration parameter. The desired number of best rated (e.g., having the highest overall rating) answers may be selected at 645 and presented (e.g., sorted, highlighted) to the user in accordance with their rating (e.g., higher rated answers may be shown on top, the highest rated answer may be highlighted) at 650.

Figure 7:
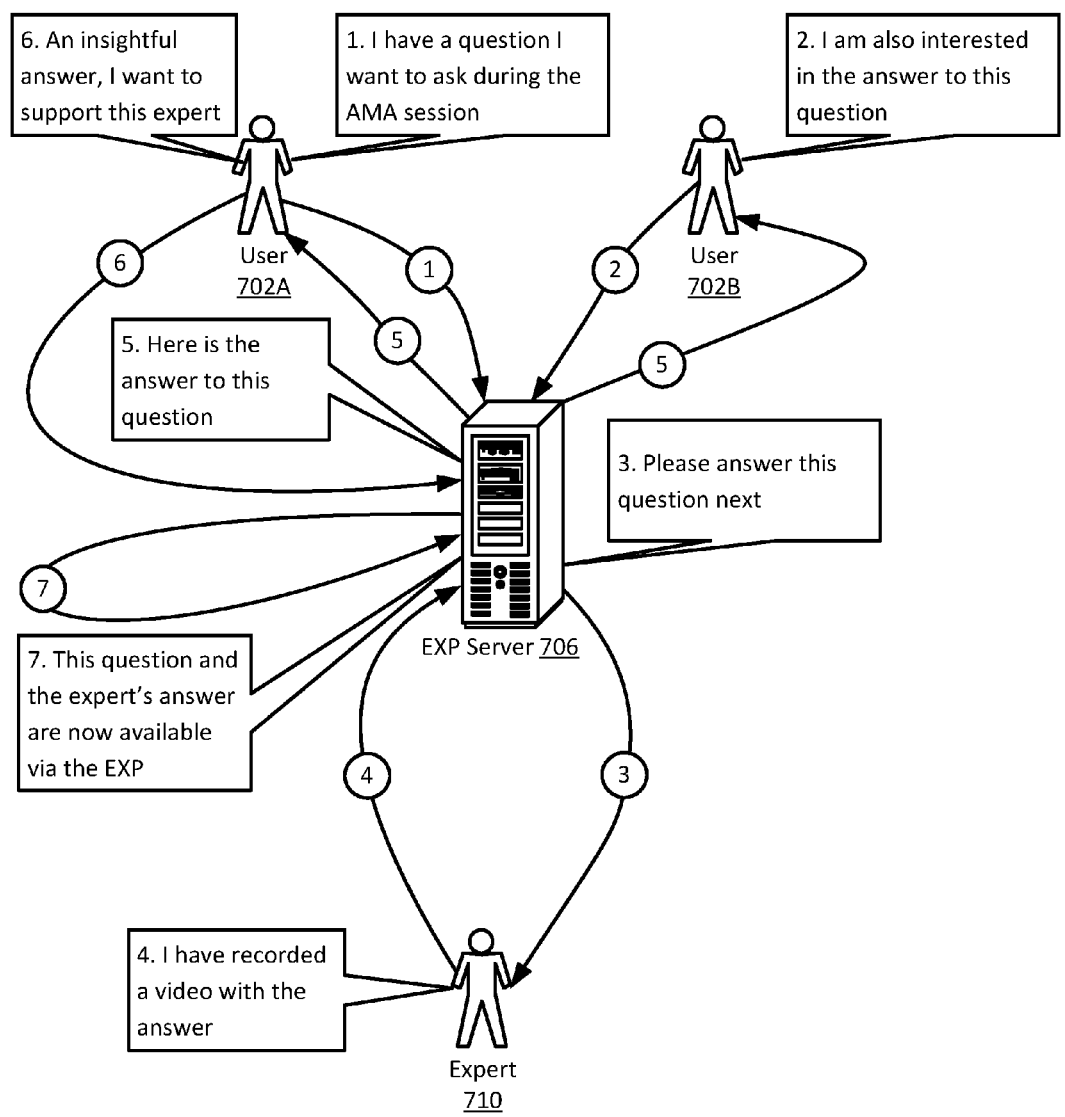
FIG. 7 shows an exemplary AMA usage scenario in one embodiment of the EXP.

FIG. 7 shows an exemplary AMA usage scenario in one embodiment of the EXP. During an ask-me-anything (AMA) session users may ask one or more experts questions (e.g., on any topic, on one or more specified topics). In FIG. 7, a user 702A may have a question for an expert 710 during an AMA session. For example, the user may wish to ask an author of a book a question during a live virtual book tour for the author. The user may ask the question via the EXP Server 706 to obtain an answer from the author. Another user 702B may also be interested in the answer to this question. The other user may utilize the EXP Server to indicate interest in having the question answered (e.g., by voting for the question). Other users may submit and/or vote for questions in a similar manner.

The EXP Server may keep track of the number of votes received for each question asked during the AMA session. Accordingly, the author may choose to answer and/or may be prompted to answer questions based on the number of votes that each question receives. For example, the author may be prompted to answer the next unanswered question with the most votes.

The author may provide a video recording with an answer via the EXP Server. The author may review and/or re-record the answer prior to posting the answer, and may embed supporting materials (e.g., images, links to websites) in the answer. Thus, the author may answer questions semi-live. Post-processing may be applied to the answer to ensure consistent video and/or audio quality.

The EXP Server may inform users who are participating in the AMA that the answer to the question is available. For example, the EXP Server may instruct a participant's client to play back the answer automatically. In another example, the EXP Server may instruct a participant's client to indicate that the question is marked as answered.

If a user enjoys the AMA session and/or finds the author's answers insightful, the user may wish to support the author. For example, the user may wish to purchase the author's book using a link available through the EXP.

Questions asked during the AMA and the corresponding answers may also be made available through the EXP in a similar manner as other non-AMA questions. Each question and the corresponding answer may be associated with topics and/or tags (e.g., assigned by the EXP, assigned by a participant, assigned by the expert). In some embodiments, the questions and the corresponding answers may be reviewed (e.g., for quality, for popularity) and/or approved (e.g., by the expert, by an EXP administrator) prior to making them available through the EXP outside of the AMA session. In one implementation, questions and/or answers may have to reach a threshold number of votes and/or views to be made available through the EXP outside of the AMA session. For example, statistical analysis (e.g., based on percentiles, based on clustering) may be utilized to select the most popular and/or highest rated questions and/or answers to be made available through the EXP outside of the AMA session.

Figure 8:
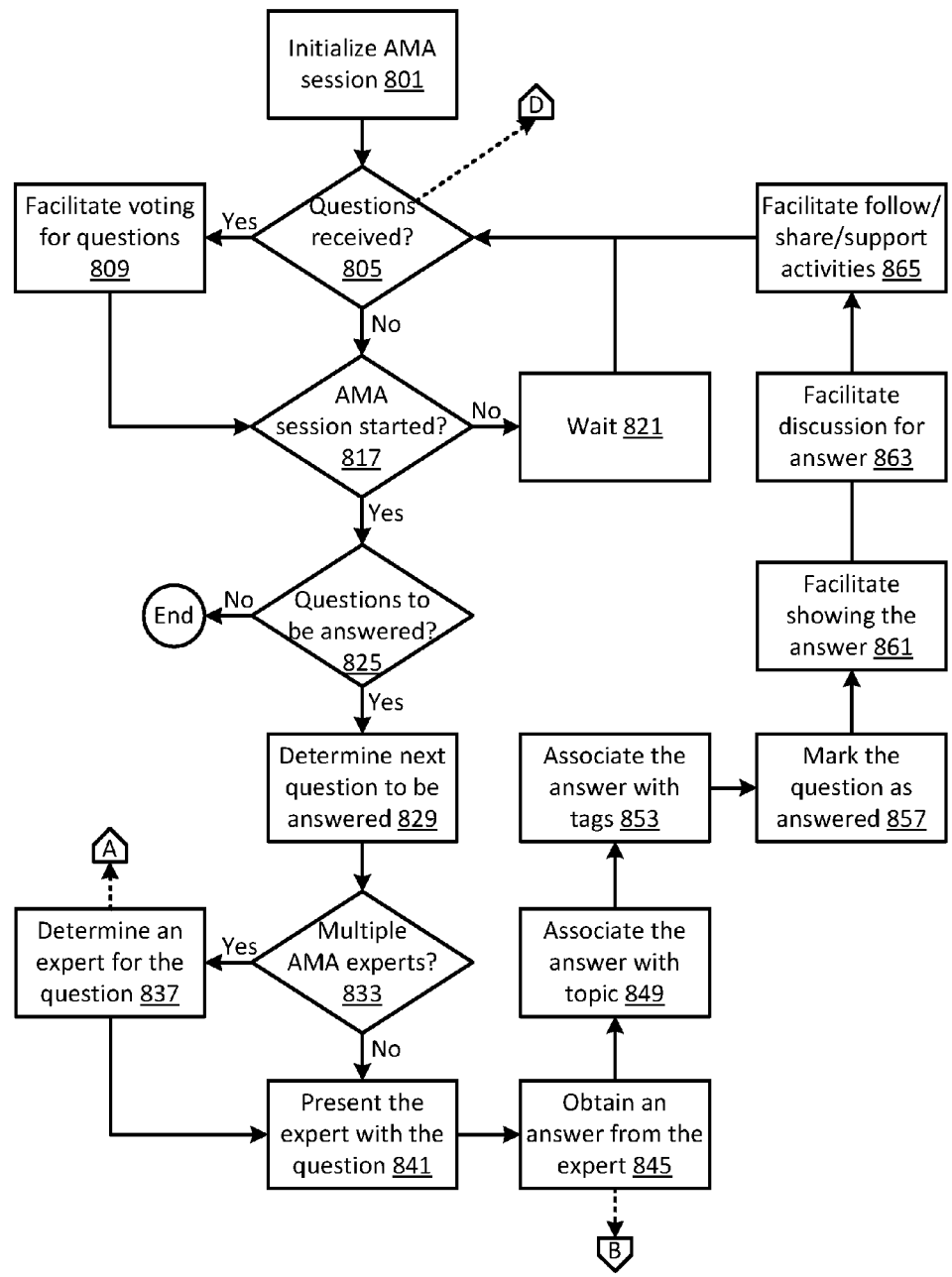
FIG. 8 shows a logic flow diagram illustrating an exemplary AMA facilitating (AF) component in one embodiment of the EXP.

FIG. 8 shows a logic flow diagram illustrating an exemplary AMA facilitating (AF) component in one embodiment of the EXP. In FIG. 8, an AMA session may be initialized at 801. In one embodiment, the AMA session may be associated with an expert or a panel of experts, and participants may be able to ask the expert or the panel of experts questions on any topic or on one or more specified topics. For example, the AMA session may be used to conduct a virtual book tour for an author, to ask (e.g., unpaid, paid) experts questions regarding a topic (e.g., during a corporate training program), to conduct a virtual town hall meeting with a politician, and/or the like. In one embodiment, initializing the AMA session may involve allowing users to post questions and/or to vote for questions. For example, users may be allowed to post questions and/or to vote for questions in advance of the start of the AMA session to obtain a sufficient number of questions and/or to determine ratings for questions to be answered during the AMA session.

A determination may be made at 805 whether questions for the AMA session have been received. See FIG. 10 for additional details regarding obtaining questions for the AMA session. If questions have been received, the EXP may facilitate voting for the received questions at 809. In one embodiment, a list of questions that have been received may be shown to users, and a user may vote for questions to express interest in having those questions answered. In another embodiment, users may flag a question (e.g., as inappropriate, and the question may be removed by the EXP after a threshold number of users flag the question). In some implementations, the EXP may facilitate user filtering (e.g., to view unanswered questions), sorting (e.g., based on the number of votes received by a question, based on the date that a question was asked), searching (e.g., to find questions of interest), and/or the like of questions asked during the AMA session to facilitate voting for the received questions.

A determination may be made at 817 whether the AMA session has been started. In one embodiment, starting the AMA session may involve introducing the expert (e.g., via a live video, via a video recorded in a similar manner as an answer to a question) and/or allowing the expert to answer questions. If the AMA session has not been started, the EXP may wait 821 and/or may continue to obtain questions and/or votes.

If the AMA session has been started, a determination may be made at 825 whether there are questions to be answered. In one embodiment, this determination may be made based on whether there remain unanswered questions (e.g., the AMA session continues until unanswered questions have been answered, the AMA session continues until unanswered questions that received a threshold number of votes have been answered). In another embodiment, this determination may be made based on a time threshold (e.g., the AMA session happens between 6 pm and 8 pm, the AMA session lasts one hour). If it is determined that there are no more questions to be answered (e.g., questions have been answered, allocated time has elapsed), the AMA session ends.

If there remain questions to be answered, the next question to be answered may be determined at 829. In one embodiment, this determination may be made by the EXP. For example, the EXP may prompt the expert to answer the highest rated (e.g., based on the number of votes) unanswered question next. In another embodiment, this determination may be made by the expert. For example, the expert may select a question from a list of questions (e.g., the list may be sorted based on question rating).

A determination may be made at 833 whether multiple experts (e.g., a panel of experts) are answering questions during the AMA. If multiple experts are answering questions during the AMA, one or more experts who should answer the next question may be determined at 837. In one implementation, the user who asks the question may direct the question to one or more experts chosen by the user. For example, the user may select an expert (e.g., using a check box associated with the expert) who should answer the question. In another implementation, the EXP may determine one or more best-rated experts who should answer the question using a variety of factors associated with each expert on the panel. In one embodiment, an expert's established reputation may be assessed. For example, the number and/or character of the expert's awards, peer reviews, media reviews, and/or the like may be evaluated. In another embodiment, the expert's field of expertise may be assessed. For example, the expert's field of research, the number and/or character of publications, the number of years spent in the field, and/or the like may be evaluated. In yet another embodiment, the level of the expert's public engagement may be assessed. For example, the expert's interest in and/or track record of participating in public discourse may be evaluated. In yet another embodiment, the expert's social impact may be assessed. For example, the expert's communication skills (e.g., reputation for explaining complex topics) may be evaluated. In one implementation, ratings (e.g., numerical ratings) may be assigned to experts based on the assessment of one or more of the above factors (e.g., overall ratings, ratings for each topic and/or subtopic and/or tag). In another implementation, ratings may be assigned to experts based on self assessment of expertise by preapproved experts. One or more best-rated experts (e.g., having highest numerical rating with regard to the topic associated with the outstanding question) on the panel may be selected to provide answers. See FIG. 4 for additional detail regarding determining one or more experts to answer a question.

The expert may be presented with the next question at 841. For example, the expert may be shown the question, additional context or background information provided by the user who asked the question, and/or the like.

The EXP may obtain an answer to the question from the expert at 845. For example, the answer may be stored in an answers data store 1130d. In various embodiments, the answer may be a video recording, an audio recording, a textual response, and/or the like. For example, the expert may use his client (e.g., a laptop with a webcam) to record and/or post a video recording. See FIG. 5 for additional detail regarding obtaining the answer from the expert. In some embodiments, the EXP may show participants which specific question is currently being answered (e.g., recorded, processed for posting). In some embodiments, the expert may choose to automatically share the expert's answers in real-time with the expert's social network (e.g., via LinkedIn, via Twitter).

The answer may be associated with the answered question and thus may be associated with the topic at 849 and/or with the tags at 853 associated with the answered question. In some embodiments, the expert may associate the answer and thus the question with additional and/or alternative topics at 849 and/or tags at 853. In some embodiments, the user who asked the question may be allowed to associate the question with topics, while the expert may be allowed to associate the answer and thus the question with tags.

Participants in the AMA session may be shown a list of questions that have been asked. In some embodiments, the list of questions may show questions, but not additional context and background information associated with questions, to keep the list of questions concise. In some embodiments, each question may be shown in such a way as to indicate statistics, such as when the question was asked, how many votes the question has received, whether the question has been answered, how many times the answer to the question has been viewed, and/or the like. In some implementations, the list of questions and associated data (e.g., answers to questions, statistics regarding questions and/or answers, comments associated with answers) may be updated dynamically using technologies such as AJAX. After obtaining the answer from the expert, the answered question may be marked as answered at 857. For example, an icon associated with the question in the list of questions may be changed to show that the question has been answered. In another example, a "This page has updated" message may be utilized to show that a question has been answered. The EXP may facilitate showing the answer to participants at 861. In one embodiment, the answer may be automatically played for a participant. For example, if the participant is following the AMA session live, the answer may be automatically played after obtaining the answer from the expert. In another example, if the participant is late to the AMA session, answers provided during the AMA session may be automatically played for the participant in order (e.g., in the order they were obtained from the expert) until the participant catches up to the rest of the AMA session. In another embodiment, a participant may indicate when the answer should be shown. For example, if the participant is commenting on the answer, subsequent answers may not be automatically played until the user finishes commenting (e.g., the user may have to manually start playback of the next answer to restart automatic playback of answers). In another example, the participant may view answers in a different order than the order in which answers were obtained from the expert (e.g., the user may click on an answer that the user wishes to watch). If the participant resumes automatic playback of answers (e.g., in the order they were obtained from the expert), the EXP may skip those answers that have already been viewed by the participant. In some implementations, the EXP may facilitate user filtering (e.g., to view answered questions), sorting (e.g., based on the number of votes received by a question, based on the date that a question was asked, based on the number of times that the answer was viewed), searching (e.g., to find questions and/or answers of interest), and/or the like of questions asked during the AMA and/or of answers provided during the AMA to help users find questions and/or answers of interest.

The EXP may facilitate discussion of the answer by participants at 863. In one embodiment, a separate comment stream (e.g., a separate discussion component) may be utilized for each question and/or answer to facilitate organized discussion. For example, the discussion component associated with the answer may be shown to a participant when the participant views the answer. The participant may comment on the answer using the discussion component. If the participant views another answer, the discussion component associated with the other answer may be shown, and the participant may comment on the other answer. In another embodiment, a single consolidated comment stream (e.g., a single discussion component) may be utilized for the AMA session.

If a user enjoys the AMA session and/or finds the author's answers insightful, the EXP may facilitate a variety of activities at 865. In one embodiment, the EXP may facilitate sharing the answer with and/or recommending the expert to the user's social network. For example, the EXP may facilitate sharing the answer with and/or recommending the expert to the user's EXP friends and/or via Facebook, LinkedIn, Twitter, email, and/or the like.

In another embodiment, the EXP may facilitate following of the expert and/or of the topic (e.g., a topic associated with the AMA session, a topic associated with the question, a topic associated with the answer) by the user. For example, if the user chooses to follow the expert, the EXP may provide the user with a readily accessible link (e.g., on the user's homepage) to the expert's profile page, alerts regarding activities of the expert, and/or the like. In another example, if the user chooses to follow a topic, the EXP may provide the user with a readily accessible link to other questions and/or answers associated with the topic.

In yet another embodiment, the EXP may facilitate user support of the expert. For example, a product may be associated with the AMA session (e.g., the AMA session is used to conduct a virtual book tour for an author), and participants may be able to purchase the product (e.g., the author's book) at any point during the AMA session (e.g., once the AMA session is initialized). In another example, the expert's profile page may provide information regarding the expert's curriculum vitae (CV), books (e.g., based on the list of expert's books obtained via an online bookstore's API using keywords), podcasts, research, articles, speaking activities, and/or the like. At any point during the AMA session, the EXP may serve as a funding channel for the expert by facilitating the purchase of such materials (e.g., books), by facilitating user funding (e.g., donations or other micro-payments) for various (e.g., research) activities, causes, non-profit organizations, and/or the like that the expert wishes to engage in and/or support.

Figure 9:
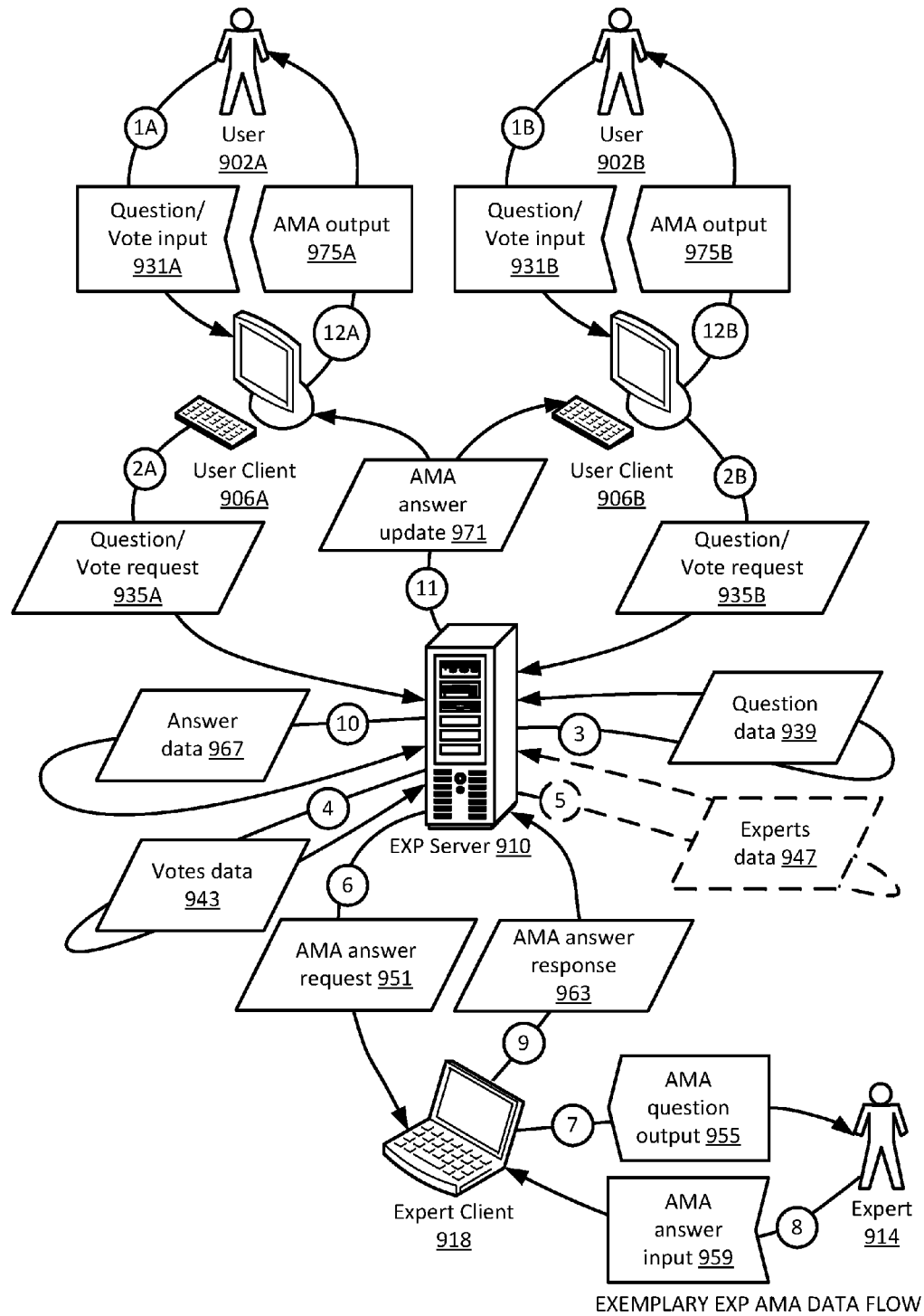
FIG. 9 shows an AMA data flow diagram in one embodiment of the EXP.

FIG. 9 shows an AMA data flow diagram in one embodiment of the EXP. In FIG. 9, dashed lines indicate data flow elements that may be more likely to be optional. FIG. 9 provides an example of how data may flow to, through, and/or from the EXP during an AMA session. In FIG. 9, one or more users 902A, 902B may input questions and/or votes for questions 931A, 931B for an AMA session using the users' clients 906A, 906B. For example, a user may type in a question. In another example, a user may vote for a question (e.g., a question submitted by another user). The users' clients may communicate question and/or vote requests 935A, 935B to the EXP server 910. For example, the question and/or vote requests 935A, 935B may include data such as a user's ID, question ID, AMA Session ID, question content, topics, tags, vote indicator, vote amount, and/or the like, and may be in XML format substantially in one of the following forms:

```
<XML>
    <QuestionRequest>
        <UserID>ID_User3</UserID>
        <QuestionID>ID_Question3</QuestionID>
        <QuestionContent>user's question and background
        info</QuestionContent>
        <QuestionTopic>AMA session topic</QuestionTopic>
    </QuestionRequest>
</XML>
<XML>
    <VoteRequest>
        <UserID>ID_User4</UserID>
        <QuestionID>ID_Question3</QuestionID>
        <Vote>increase rating by 1</Vote>
    </VoteRequest>
</XML>
```

The EXP server may analyze question data 939 to determine topics and/or tags that should be associated with the question. The EXP server may also analyze question data 939 to determine whether other questions have been asked that are similar to the question obtained from the user. For example, the question data may include question keywords, topics, tags, and/or the like.

The EXP server may analyze votes data 943 to determine ratings that should be assigned to questions and/or to determine which question should be asked next during the AMA session. For example, the votes data may include question ID, question rating, vote indicators, vote amounts, and/or the like.

If multiple experts are answering questions during the AMA, the EXP server may analyze experts data 947 to determine which expert should be asked to answer the next question. For example, the experts data may include experts' IDs, experts' overall ratings, experts' topic ratings, experts' subtopic ratings, and/or the like.

If an expert 914 selects a question to answer (e.g., by selecting the highest rated unanswered AMA question), an AMA answer request 951 may be sent to the expert's client 918. For example, the AMA answer request 951 may include data such as question ID, question content, question priority, and/or the like, and may be in XML format substantially in the following form:

```
<XML>
    <AnswerRequest>
        <QuestionID>ID_Question3</QuestionID>
        <QuestionContent>user's question and background
        info</QuestionContent>
        <QuestionTopic>AMA session topic</QuestionTopic>
        <QuestionRating>10</QuestionRating>
    </AnswerRequest>
</XML>
```

The AMA question may be output 955 to the expert. For example, the expert may view the question on the client's display. The expert may use the client to input an AMA answer 959 to the question. For example, the expert may use a computer with a webcam to make a video recording. The expert's client may provide an AMA answer response 963 to the EXP server. For example, the answer response may include data such as question ID, answer ID, answer content, background template, media, topics, tags, expert ID, and/or the like, and may be in XML format substantially in the following form:

```
<XML>
    <AnswerResponse>
        <QuestionID>ID_Question3</QuestionID>
        <AnswerID>ID_Answer3</AnswerID>
        <AnswerContent>expert's answer</AnswerContent>
        <AnswerTopic>AMA session topic</AnswerTopic>
        <AnswerTag>Book Chapter 5</AnswerTag>
        <BackgroundTemplate>Audio1</BackgroundTemplate>
        <ExpertID>ID_Expert1</ExpertID>
    </AnswerResponse>
</XML>
```

The EXP server may analyze answer data 967 to convert the answer into an appropriate format (e.g., convert MPEG2 video format provided by the expert into a streaming video format), to determine whether the answer should be associated with additional topics and/or tags, and/or the like. For example, the answer data may include question ID, answer ID, answer format, topics, tags, and/or the like.

The EXP server may send an AMA answer update 971 to the users' clients 906A, 906B. The AMA answer update may inform the users' clients that a question was answered, may provide (e.g., stream) the users' clients with the video recording of the answer, may allow commenting on the answer, and/or the like. The AMA answer update may include data such as answer ID, answer content, answer rating, expert ID, and/or the like, and may be in XML format substantially in the following form:

```
<XML>
    <AMAAnswerUpdate>
        <AnswerID>ID_Answer3</AnswerID>
        <AnswerContent>expert's answer</AnswerContent>
        <ExpertID>ID_Expert1</ExpertID>
    </AMAAnswerUpdate>
</XML>
```

The answer may be output 975A, 975B to one or more users 902A, 902B. For example, the users' clients 906A, 906B may play back the video recording of the answer to the users.

Figure 10:
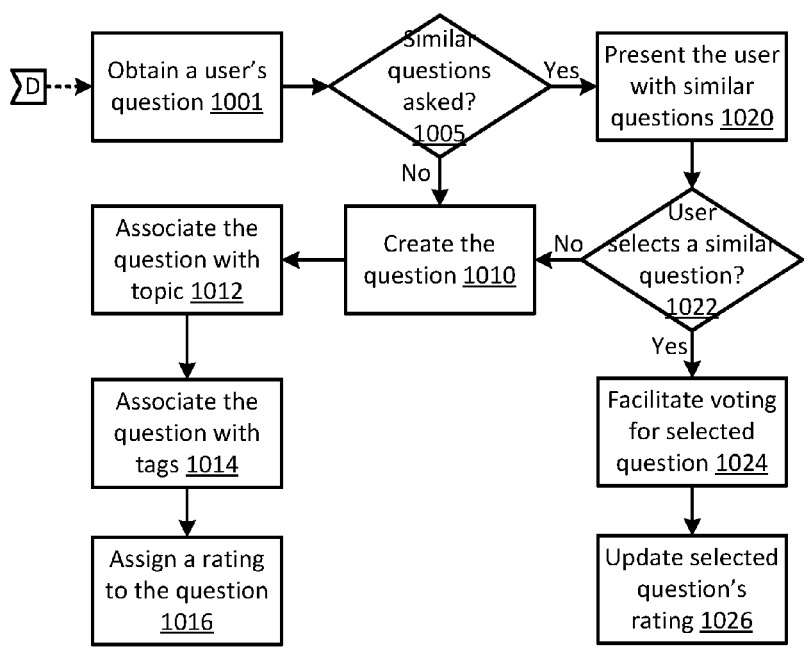
FIG. 10 shows a logic flow diagram illustrating an exemplary AMA question obtaining (AQO) component in one embodiment of the EXP.

FIG. 10 shows a logic flow diagram illustrating an exemplary AMA question obtaining (AQO) component in one embodiment of the EXP. In FIG. 10, a question for an AMA session with an expert may be obtained from a user at 1001. The user may provide a question via a client (e.g., a desktop, a laptop, a tablet, a smart phone, and/or the like). In one embodiment, the user may input a question in a textual and/or graphical form. For example, the user may type in a question and/or provide additional context or background information. In another embodiment, the user may input a question in an audio and/or video form. For example, the user may use a microphone and/or a webcam to record a question. In some implementations, an audio and/or video question may be converted to a textual form (e.g., using speech recognition software).

A determination may be made at 1005 whether other questions have been asked for the AMA session that are similar to the question obtained from the user. In one embodiment, a textual search may be performed by the EXP to make this determination. For example, a full-text search may be performed via MySQL using one or more SQL commands substantially in the following form:

```
SELECT *
FROM AMASessionQuestions
MATCH(QuestionContent) AGAINST("user's question")
```

In another embodiment, topics and/or tags associated with the user's question may be used by the EXP to make this determination. For example, topics and/or tags associated with the user's question may be compared to topics and/or tags associated with existing AMA session questions to find questions that have the most topics and/or tags in common with the user's question.

If similar AMA session questions have been asked, the EXP may present the user with similar questions at 1020. For example, the EXP may present the user with a list of similar AMA session questions via a GUI widget (e.g., a dropdown box). In one implementation, as the user types in a question, the EXP may update the list of similar AMA session questions and the user may click on one of the similar AMA session questions to select it. A determination may be made at 1022 whether the user selected one of the similar AMA session questions. If the user did not select a similar AMA session question or if similar AMA session questions have not been asked, the EXP may create an AMA session question at 1010. For example, the EXP may add the user's question to a data store (e.g., the questions data store 1130*c*) via one or more SQL statements substantially in the following form:

```
INSERT INTO AMASessionQuestions (QuestionID, QuestionContent)
VALUES ("question identifier", "user's question")
```

The user's AMA session question may be associated with one or more topics at 1012. In one embodiment, topics may be predefined by an EXP administrator (e.g., one or more topics may be associated with the AMA session). In another embodiment, topics may be defined by users. In various implementations, topics may include a one-level structure, a two-level structure (e.g., topics and sub-topics), a multi-level structure, and/or the like. In one embodiment, the EXP may assign one or more topics to the user's question (e.g., using keyword analysis). For example, keywords may be associated with AMA session topics, and questions may be assigned one or more of the associated AMA topics based on keywords in the question. In another embodiment, the user may assign one or more topics to the user's question (e.g., by selecting one or more of the predefined topics and/or sub-topics via a GUI). For example, the entry for the user's question in the questions data store may be associated with assigned topics via one or more SQL statements substantially in the following form:

```
UPDATE AMASessionQuestions
SET QuestionTopics="AMA session topic"
WHERE QuestionID="question identifier"
```

The user's AMA session question may be associated with one or more tags at 1014. For example, tags may include keyword tags, social networking tags (e.g., Twitter hash tags, Facebook tags), and/or the like. In one embodiment, tags may be predefined by the EXP (e.g., via the tags data store 1130*f*). In another embodiment, tags may be defined by users. In one embodiment, the EXP may assign one or more tags to the user's question (e.g., using keyword analysis). For example, keywords may be associated with tags (e.g., a keyword that appears in Chapter 5 of the expert's book may be associated with the tag "Book Chapter 5") and questions may be assigned tags based on keywords in the question. In another embodiment, the user may assign one or more tags to the user's question (e.g., by specifying one or more tags). For example, the entry for the user's question in the questions data store may be associated with assigned tags from the tags data store via one or more SQL statements substantially in the following form:

```
UPDATE AMASessionQuestions
SET QuestionTags="Book Chapter 5"
WHERE QuestionID="question identifier"
```

The user's AMA session question may be assigned a rating at 1016. The rating may indicate interest in, importance of, urgency of, and/or the like of the user's question. For example, one or more SQL statements may be used to store the rating in the questions data store. In one embodiment, a question may be assigned a predefined rating associated with new questions (e.g., a rating of 1). In another embodiment, a question (e.g., associated with a topic) may be assigned a rating that varies based on the characteristics of the user who asked the question (e.g., if the question was asked by a user who is an expert in the topic, the question may get a higher rating of 2). In yet another embodiment, the user may indicate the user's interest in having a question answered and/or the priority assigned to a question by the user (e.g., a low interest/priority question may get a rating of 0.5, a medium interest/priority question may get a rating of 1, a high interest/priority question may get a rating of 1.5).

If the user did select a similar question at 1022, the EXP may facilitate voting for the selected AMA session question at 1024. Voting for a question allows a user to indicate interest in having the question answered by an expert during the AMA session. In one embodiment, the user may use a GUI widget (e.g., a "Vote" button) to vote for a question. In one implementation, the user may be offered an opportunity to vote for a question. In another implementation, the user may be offered an opportunity to express the level of interest in having a question answered and/or the priority assigned to a question by the user.

The rating associated with the selected AMA session question may be updated at 1026. In one embodiment, the rating associated with a question may be updated by a predefined amount associated with having an additional user vote for a question (e.g., increased by 1). In another embodiment, the rating associated with a question (e.g., associated with a topic) may be updated based on the characteristics of the user who voted for the question (e.g., if the question was voted for by an expert on the topic, the question's rating may be increased by 2). In yet another embodiment, the rating associated with a question may be updated based on the voter's level of interest in having a question answered and/or the priority assigned to a question by the user. For example, the rating may be increased by 0.5 for a low interest/priority question, by 1 for a medium interest/priority question, and by 1.5 for a high interest/priority question. In one implementation, the rating associated with the selected question may be updated via one or more SQL statements substantially in the following form:

```
UPDATE AMASessionQuestions
SET QuestionRating="new rating"
WHERE QuestionID="question identifier"
```

APPENDIX 1 illustrates additional exemplary embodiments of the EXP.

DETAILED DESCRIPTION OF THE EXP COORDINATOR

Figure 11:
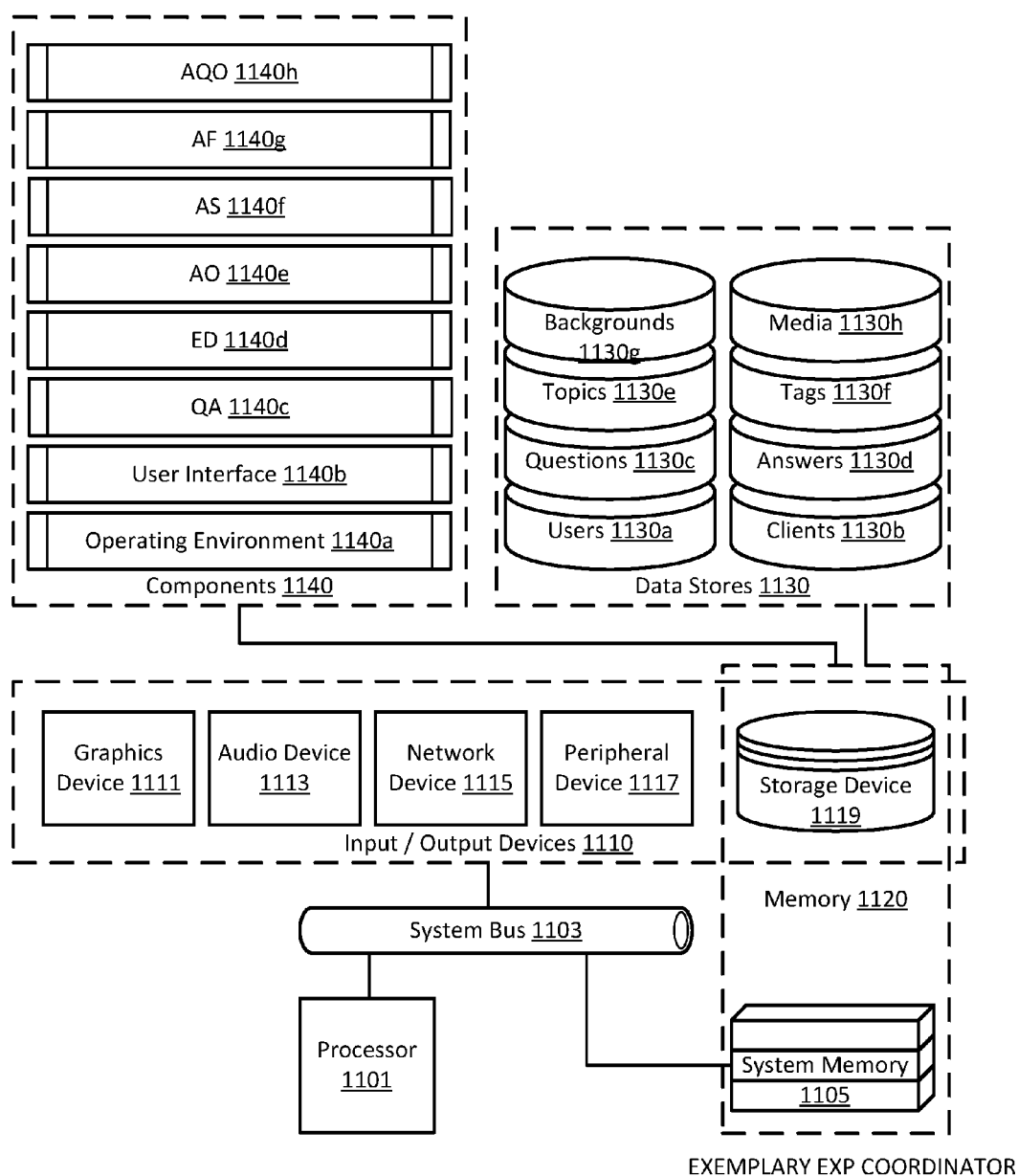
FIG. 11 shows a block diagram illustrating an exemplary EXP coordinator in one embodiment of the EXP.

FIG. 11 shows a block diagram illustrating an exemplary EXP coordinator in one embodiment of the EXP. The EXP coordinator facilitates the operation of the EXP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the EXP coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the EXP coordinator may comprise a stand-alone computer system, a distributed computer system, a node in a computer network (i.e., a network of computer systems organized in a topology), a network of EXP coordinators, and/or the like. It is to be understood that the EXP coordinator and/or the various EXP coordinator elements (e.g., processor, system bus, memory, input/output devices) may be organized in any number of ways (i.e., using any number and configuration of computer systems, computer networks, nodes, EXP coordinator elements, and/or the like) to facilitate EXP operation. Furthermore, it is to be understood that the various EXP coordinator computer systems, EXP coordinator computer networks, EXP coordinator nodes, EXP coordinator elements, and/or the like may communicate among each other in any number of ways to facilitate EXP operation. As used in this disclosure, the term "user" refers generally to people and/or computer systems that interact with the EXP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The EXP coordinator includes a processor 1101 that executes program instructions (e.g., EXP program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 1105 via a system bus 1103. The system bus may interconnect these and/or other elements of the EXP coordinator via electrical, electronic, optical, wireless, and/or the like communication links (e.g., the system bus may be integrated into a motherboard that interconnects EXP coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., EXP program instructions) executed by the processor. The system memory may facilitate accessing, storing, retrieving, modifying, deleting, and/or the like data (e.g., EXP data) by the processor.

In various embodiments, input/output devices 1110 may be connected to the processor and/or to the system memory, and/or to one another via the system bus.

In some embodiments, the input/output devices may include one or more graphics devices 1111. The processor may make use of the one or more graphic devices in accordance with program instructions (e.g., EXP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., EXP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 1113. The processor may make use of the one or more audio devices in accordance with program instructions (e.g., EXP program instructions) executed by the processor. In one implementation, an audio device may be a sound card that may obtain (e.g., via a connected microphone), process, output (e.g., via connected speakers), and/or the like audio data (e.g., EXP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 1115. The processor may make use of the one or more network devices in accordance with program instructions (e.g., EXP program instructions) executed by the processor. In one implementation, a network device may be a network card that may obtain (e.g., via a Category 5 Ethernet cable), process, output (e.g., via a wireless antenna), and/or the like network data (e.g., EXP data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 1117. The processor may make use of the one or more peripheral devices in accordance with program instructions (e.g., EXP program instructions) executed by the processor. In various implementations, a peripheral device may be a digital camera, a video camera, a webcam, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, sensors (e.g., proximity sensor, ambient temperature sensor, ambient light sensor, humidity sensor, an accelerometer, a gyroscope, a motion sensor, an olfaction sensor, a biosensor, a chemical sensor, a magnetometer, a radar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the EXP coordinator with a variety of input, output and processing capabilities.

In some embodiments, the input/output devices may include one or more storage devices 1119. The processor may access, read from, write to, store in, erase, modify, and/or the like a storage device in accordance with program instructions (e.g., EXP program instructions) executed by the processor. A storage device may facilitate accessing, storing, retrieving, modifying, deleting, and/or the like data (e.g., EXP data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 1105 and the one or more storage devices 1119 may be referred to as memory 1120 (i.e., physical memory).

EXP memory 1120 contains processor-operable (e.g., accessible) EXP data stores 1130. Data stores 1130 comprise data that may be used (e.g., by the EXP) via the EXP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, EXP coordinator elements, and/or the like) to facilitate EXP operation. For example, EXP data stores may comprise data stores 1130*a*-*h* implemented as one or more databases. A users data store 1130*a* may be a collection of database tables that include fields such as UserID, UserName, UserPreferences, IsExpert, ExpertTopics, and/or the like. A clients data store 1130*b* may be a collection of database tables that include fields such as ClientID, ClientName, ClientDeviceType, ClientScreenResolution, and/or the like. A questions data store 1130*c* may be a collection of database tables that include fields such as QuestionID, QuestionContent, QuestionTopics, QuestionTags, QuestionRating, QuestionFormat, and/or the like. An answers data store 1130*d* may be a collection of database tables that include fields such as AnswerID, AnswerContent, AnswerFormat, AnsweredQuestionID, ExpertID, and/or the like. A topics data store 1130*e* may be a collection of database tables that include fields such as TopicID, TopicName, TopicSubtopics, and/or the like. A tags data store 1130*f* may be a collection of database tables that include fields such as TagID, TagName, TagCategory, and/or the like. A backgrounds data store 1130*g* may be a collection of database tables that include fields such as BackgroundID, BackgroundContent, AssociatedTopic, AssociatedTag, and/or the like. A media data store 1130*h* may be a collection of database tables that include fields such as MediaID, MediaContent, MediaLink, AssociatedKeywords, and/or the like. The EXP coordinator may use data stores 1130 to keep track of inputs, parameters, settings, variables, records, outputs, and/or the like.

EXP memory 1120 contains processor-operable (e.g., executable) EXP components 1140. Components 1140 comprise program components (including program instructions and any associated data stores) that are executed (e.g., by the EXP) via the EXP coordinator (i.e., via the processor) to transform EXP inputs into EXP outputs. It is to be understood that the various components and their subcomponents, capabilities, applications, and/or the like may be organized in any number of ways (i.e., using any number and configuration of components, subcomponents, capabilities, applications, EXP coordinator elements, and/or the like) to facilitate EXP operation. Furthermore, it is to be understood that the various components and their subcomponents, capabilities, applications, and/or the like may communicate among each other in any number of ways to facilitate EXP operation. For example, the various components and their subcomponents, capabilities, applications, and/or the like may be combined, integrated, consolidated, split up, distributed, and/or the like in any number of ways to facilitate EXP operation. In another example, a single or multiple instances of the various components and their subcomponents, capabilities, applications, and/or the like may be instantiated on each of a single EXP coordinator node, across multiple EXP coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 1140 may include an operating environment component 1140*a*. The operating environment component may facilitate operation of the EXP via various subcomponents.

In some implementations, the operating environment component may include an operating system subcomponent. The operating system subcomponent may provide an abstraction layer that facilitates the use of, communication among, common services for, interaction with, security of, and/or the like of various EXP coordinator elements, components, data stores, and/or the like.

In some embodiments, the operating system subcomponent may facilitate execution of program instructions (e.g., EXP program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the EXP. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the EXP coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the EXP coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the EXP by providing user interface elements that may be used by the EXP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate EXP capabilities such as storage, analysis, retrieval, access, modification, deletion, aggregation, generation, and/or the like of data (e.g., the use of data stores 1130). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, and/or the like.

In some implementations, the operating environment component may include an information handling subcomponent. The information handling subcomponent may provide the EXP with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, EXP components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 1130) via the database subcomponent.

In some embodiments, the information handling subcomponent may facilitate presentation of information obtained from users, EXP components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate EXP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate EXP message communications. The messaging subcomponent may facilitate message communications such as email, instant messaging, Voice over IP (VoIP), video conferencing, Short Message Service (SMS), web chat, and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates EXP security. In some embodiments, the security subcomponent may restrict access to the EXP, to one or more services provided by the EXP, to data associated with the EXP (e.g., stored in data stores 1130), to communication messages associated with the EXP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the EXP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates EXP virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 1140 may include a user interface component 1140b. The user interface component may facilitate user interaction with the EXP by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 1140 may include components QA 1140c, ED 1140d, AO 1140e, AS 1140f, AF 1140g, AQO 1140h described in more detail in preceding figures.

THE EMBODIMENTS OF THE EXP

The entirety of this disclosure (including the written description, figures, claims, abstract, appendices, and/or the like) for EXPERT ANSWER PLATFORM METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed to preserve space and/or reduce repetition. That alternate embodiments have not been discussed is not to be considered a disclaimer of such alternate undescribed embodiments, and no inference should be drawn regarding such alternate undescribed embodiments relative to those discussed in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the EXP coordinator, EXP coordinator elements, EXP data stores, EXP components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the EXP coordinator, EXP coordinator elements, EXP data stores, EXP components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the EXP discussed in this disclosure have been directed to obtaining expert answers and conducting AMA sessions, the innovations described in this disclosure may be readily applied to a wide variety of other fields and/or applications.

The following is claimed:

1. An answer providing apparatus, comprising:
    a memory;
    a processor in communication with the memory, and configured to issue a plurality of processing instructions stored in the memory, wherein the processor issues instructions to:
    a) obtain, via processor, from an AMA participant, a request to join a live AMA session that is already in progress;
    b) determine, via processor, a question associated with the live AMA session that has already been answered by an expert associated with the AMA session and which should be presented for the AMA participant next;
    c) facilitate, via processor, automatic playback of a video recording of the expert's answer to the question for the AMA participant;
    d) repeat b) and c) until the AMA participant catches up to the live AMA session;
    e) determine, via processor, a current question that is currently being answered by the expert;
    f) facilitate, via processor, generating a current question visualization, wherein the current question visualization informs the AMA participant that an answer to the current question is currently being recorded by the expert;
    g) obtain, via processor, a video recording of the expert's answer to the current question; and
    h) facilitate, via processor, automatic playback of the video recording of the expert's answer to the current question for the AMA participant.

2. The apparatus of claim 1, wherein the processor further issues instructions to:
    retrieve a prerecorded video introduction of the expert; and
    facilitate automatic playback of the prerecorded video introduction prior to facilitating automatic playback of a video recording of the expert's answer to the first question which should be presented for the AMA participant.

3. The apparatus of claim 1, wherein instructions to determine a question which should be presented for the AMA participant next further comprise instructions to:
    determine the order in which video recordings of the expert's answers have been obtained from the expert; and
    select the question which should be presented for the AMA participant next in accordance with the determined order.

4. The apparatus of claim 3, wherein instructions to select the question which should be presented for the AMA participant next further comprise instructions to:
    select a question in accordance with the determined order;
    determine that the AMA participant previously viewed a video recording of the expert's answer to the question;
    select a subsequent question in accordance with the determined order;
    determine that the AMA participant did not previously view a video recording of the expert's answer to the subsequent question; and
    select the subsequent question as the question which should be presented for the AMA participant next.

5. The apparatus of claim 1, wherein instructions to repeat b) and c) until the AMA participant catches up to the live AMA session further comprise instructions to:
- pause repeating b) and c) while the AMA participant is commenting on a video recording of the expert's answer to a question; and
- resume repeating b) and c) when the AMA participant manually starts playback of a video recording of the expert's answer to a subsequent question.

6. The apparatus of claim 1, wherein the current question visualization includes a discussion component that is separate from discussion components associated with other questions.

7. The apparatus of claim 1, wherein instructions to obtain a video recording of the expert's answer to the current question further comprise instructions to:
- identify media items related to the current question for the expert;
- obtain a selection from the expert of a media item from the identified media items; and
- embed the selected media item into the video recording of the expert's answer to the current question.

8. The apparatus of claim 7, wherein instructions to facilitate automatic playback of the video recording of the expert's answer to the current question further comprise instructions to facilitate automatic playback of the embedded media item.

9. The apparatus of claim 1, wherein the expert is one of a plurality of experts participating in the live AMA session.

10. The apparatus of claim 1, wherein the processor further issues instructions to facilitate alerting the AMA participant that the current question has been answered.

11. The apparatus of claim 10, wherein instructions to facilitate alerting the AMA participant that the current question has been answered further comprise instructions to change an icon associated with the current question to show that the current question has been answered.

12. The apparatus of claim 1, wherein the processor further issues instructions to facilitate automatic real time sharing of the video recording of the expert's answer to the current question with the expert's social network.

13. The apparatus of claim 1, wherein the processor further issues instructions to facilitate sharing of the video recording of the expert's answer to the current question with the AMA participant's social network.

14. An answer providing processor-readable non-transitory physical medium storing processor-issuable instructions to:
a) obtain, via processor, from an AMA participant, a request to join a live AMA session that is already in progress;
b) determine, via processor, a question associated with the live AMA session that has already been answered by an expert associated with the AMA session and which should be presented for the AMA participant next;
c) facilitate, via processor, automatic playback of a video recording of the expert's answer to the question for the AMA participant;
d) repeat b) and c) until the AMA participant catches up to the live AMA session;
e) determine, via processor, a current question that is currently being answered by the expert;
f) facilitate, via processor, generating a current question visualization, wherein the current question visualization informs the AMA participant that an answer to the current question is currently being recorded by the expert;
g) obtain, via processor, a video recording of the expert's answer to the current question; and
h) facilitate, via processor, automatic playback of the video recording of the expert's answer to the current question for the AMA participant.

15. A processor-implemented answer providing method, comprising executing instructions to:
a) obtain, via processor, from an AMA participant, a request to join a live AMA session that is already in progress;
b) determine, via processor, a question associated with the live AMA session that has already been answered by an expert associated with the AMA session and which should be presented for the AMA participant next;
c) facilitate, via processor, automatic playback of a video recording of the expert's answer to the question for the AMA participant;
d) repeat b) and c) until the AMA participant catches up to the live AMA session;
e) determine, via processor, a current question that is currently being answered by the expert;
f) facilitate, via processor, generating a current question visualization, wherein the current question visualization informs the AMA participant that an answer to the current question is currently being recorded by the expert;
g) obtain, via processor, a video recording of the expert's answer to the current question; and
h) facilitate, via processor, automatic playback of the video recording of the expert's answer to the current question for the AMA participant.

* * * * *